US012750870B2

(12) United States Patent
Zhang et al.

(10) Patent No.: US 12,750,870 B2
(45) Date of Patent: Sep. 29, 2026

(54) METHOD AND DEVICE USED FOR RELAY WIRELESS COMMUNICATION

(71) Applicant: BUNKER HILL TECHNOLOGIES LLC, Allen, TX (US)

(72) Inventors: Jinfang Zhang, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 421 days.

(21) Appl. No.: 18/231,790

(22) Filed: Aug. 9, 2023

(65) Prior Publication Data

US 2023/0389052 A1 Nov. 30, 2023

Related U.S. Application Data

(63) Continuation of application No. PCT/CN2022/075818, filed on Feb. 10, 2022.

(30) Foreign Application Priority Data

Feb. 13, 2021 (CN) ......................... 202110185956.3
Feb. 25, 2021 (CN) ......................... 202110210927.8

(51) Int. Cl.
*H04W 72/40* (2023.01)
*H04W 76/27* (2018.01)

(52) U.S. Cl.
CPC ........... *H04W 72/40* (2023.01); *H04W 76/27* (2018.02)

(58) Field of Classification Search
None
See application file for complete search history.

(56) References Cited

U.S. PATENT DOCUMENTS

2015/0113128 A1 4/2015 Huang et al.
2016/0338095 A1* 11/2016 Faurie .................. H04W 72/23
(Continued)

FOREIGN PATENT DOCUMENTS

CN 101262625 A 9/2008
CN 108810906 A 11/2018
JP 2017158219 A 9/2017

OTHER PUBLICATIONS

ISR received in application No. PCT/CN2022/075818 dated Apr. 27, 2022.

*Primary Examiner* — Jamaal Henson
(74) *Attorney, Agent, or Firm* — Ascenda Law Group, PC

(57) ABSTRACT

The present application provides a method and device for relay wireless communications. A node receives a first message through sidelink; determines a first transmission mode based on at least the first message; transmits a first bit group by adopting the first transmission mode, the first bit group comprises at least one bit; wherein the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied. The reasonable selection of small data transmission mode in the relay transmission network architecture of the present application can effectively reduce the signaling overhead of the relay node and reduce the power consumption of the relay node.

17 Claims, 13 Drawing Sheets

(56) References Cited

U.S. PATENT DOCUMENTS

| | | | | |
|---|---|---|---|---|
| 2018/0048986 | A1* | 2/2018 | Adachi | H04W 76/14 |
| 2018/0084480 | A1* | 3/2018 | Yasukawa | H04W 88/04 |
| 2018/0206176 | A1 | 7/2018 | Panteleev et al. | |
| 2019/0037621 | A1* | 1/2019 | Feng | H04W 88/02 |
| 2019/0123814 | A1* | 4/2019 | Martin | H04L 69/14 |
| 2019/0373652 | A1* | 12/2019 | Hong | H04W 76/14 |
| 2020/0053802 | A1* | 2/2020 | Li | H04W 12/06 |
| 2020/0068510 | A1 | 2/2020 | Martin et al. | |
| 2020/0100088 | A1* | 3/2020 | Kim | H04W 48/16 |
| 2020/0389900 | A1* | 12/2020 | Lee | H04W 72/53 |
| 2021/0289580 | A1* | 9/2021 | Damnjanovic | H04W 24/02 |
| 2022/0408226 | A1* | 12/2022 | Fehrenbach | H04W 84/005 |
| 2023/0146227 | A1* | 5/2023 | Lee | H04W 28/0278 370/329 |

* cited by examiner

Case A

Case B

METHOD AND DEVICE USED FOR RELAY WIRELESS COMMUNICATION

CROSS REFERENCE TO RELATED APPLICATIONS

This application is the continuation of the international patent application No. PCT/CN2022/075818, filed on Feb. 10, 2022, which claims the priority benefit of Chinese patent application No. 202110185956.3, filed on Feb. 13, 2021, and claims the priority benefit of Chinese Patent Application No. 202110210927.8, filed on Feb. 25, 2021, the full disclosure of which is incorporated herein by reference.

BACKGROUND

Technical Field

The present application relates to methods and devices in wireless communication systems, particularly to a method and device that supports small data transmission in relay wireless communications.

Related Art

In response to the rapidly developing Vehicle-to-Everything (V2X) business, 3rd Generation Partner Project (3GPP) has started the development and research of Sidelink (SL) standards under the framework of New Radio (NR) technology (or Fifth Generation, 5G), and decided to initiate a Study Item (SI) standardization work for NR SL Relay at 3GPP RAN #86 plenary. As a multi-hop transmission technology, relay can increase throughput and expand coverage.

Relay communication is a common method in cellular network communications. Data from a source node is forwarded by a relay node to a remote node. The source node and the remote node are usually a base station and a User Equipment (UE), or both UEs, or a UE and a base station; the relay node may be a network device or a UE. Taking SL transmission in Long Term Evolution (LTE) system as an example, a transmission from a UE to an RN adopts SL radio technology, and a transmission from a RN to a base station (eNodeB, eNB) adopts LTE radio technology. The RN is used for data forwarding between a UE and an eNB, which can be called Internet Protocol (IP) layer forwarding or Layer 3 (L3) relaying.

NR supports Radio Resource Control (RRC)_Inactive state, a user equipment (UE) with infrequent (including periodic and aperiodic) data transmission requirement is usually configured by the network to camp in RRC_INACTIVE state when there is no data transmission. When the UE has a data transmission demand, it enters into RRC_CONNECTED state from RRC_INACTIVE state to perform data transmission, and then re-enters RRC_INACTIVE state after the data transmission ends. Until Rel-16, 3GPP did not support transmitting data in RRC_INACTIVE state, for small data transmission, signaling overhead for RRC state switching is greater than the transmission overhead of small data, and the power consumption overhead of the UE is also increased. Therefore, at 3GPP RAN #88e plenary, it was decided to initiate the standardization work of a Work Item (WI) for small data transmission in RRC_INACTIVE state.

SUMMARY

Inventors have found through researches that in Layer 2 (L2) UE-to-Network relay communications, a source node (for uplink transmission) and a relay node can be in a same or different RRC states, comprising RRC_CONNECTED state and RRC_INACTIVE state; if the relay node is in RRC_INACTIVE state and after receiving small data from the source node, it needs to enter into RRC_CONNECTED state for forwarding, which will cause excessive the signaling overhead for the relay node; how to effectively support small data transmission in relay transmission needs to be studied.

In response to the above issues, the present application discloses a solution for determining the small data transmission mode of the source node under the relay transmission network architecture. Through received relay node message, a source node can determine whether to directly transmit small data via a Uu air interface, or to use the relay node to forward small data via a PC5 air interface. The present solution can increase the signaling overhead of the relay node forwarding small data while reducing the power consumption of the relay node.

Inventors have found through researches that in two relay communication modes, L2 UE-to-Network and L3 UE-to-Network, a source node (for uplink transmission) and/or a remote node (for downlink) and a relay node can be in a same or different RRC states, comprising RRC_CONNECTED state and RRC_INACTIVE state; data at the relay node can be forwarded either in RRC_INACTIVE state or after entering into RRC_CONNECTED state; how to effectively support data transmission, especially small data transmission, in relay transmission needs to be studied. In response to the above issues, the present application discloses a solution for determining RRC state and relay mode in data transmission of a relay node. At the relay node, through received message transmitted by the source node, it is determined that L2 or L3 relay transmission is carried out in RRC_INACTIVE state or RRC_CONNECTED state, which can increase the signaling overhead of data transmission between the relay node and the source node, while reducing the power consumption of the relay node and the source node.

And the embodiments in the present application and the characteristics in the embodiments can be arbitrarily combined if there is no conflict. Further, although the present application is originally targeted at relay and terminal scenarios, it is also applicable to relay and base stations scenarios, where similar technical effects can be achieved. Additionally, the adoption of a unified solution for various scenarios, including but not limited to V2X scenarios and communication scenarios between terminals and base stations, contributes to the reduction of hardware complexity and costs. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

- receiving a first message through sidelink; determining a first transmission mode based on at least the first message; and
- transmitting a first bit group by adopting the first transmission mode, the first bit group comprising at least one bit;
- herein, the first transmission mode is one transmission mode in a candidate transmission mode set, the candidate transmission mode set comprises a transmission through cellular link and a transmission through sidelink; the first message indicates a first condition set, and the first condition set comprises at least one condition;

when condition(s) in the first condition set is(are) satisfied, the candidate transmission mode set comprises a candidate transmission mode of a transmission through sidelink.

In one embodiment, the present application is applicable to UE-to-Network relay transmission.

In one embodiment, the present application is applicable to L2 relay.

In one embodiment, a problem to be solved in the present application is: how to effectively support small data transmission of the source node in relay transmission network architecture, avoiding excessive signaling overhead, and reducing the efficiency of the wireless communication system.

In one embodiment, solutions of the present application include: a source node determines a small data transmission mode in RRC_INACTIVE state by receiving message transmitted by the relay node; the small data transmission mode comprises one of directly transmitting to the network device through cellular link or forwarding via a relay node through sidelink.

In one embodiment, beneficial effects of the present application include: a source node flexibly determines a small data transmission mode based on the received relay node message, which can effectively reduce the signaling overhead of the relay node supporting the small data transmission of the source node and reduce the power consumption of the relay node.

According to one aspect of the present application, comprising:

the first condition set comprising that the first message comprises RRC_CONNECTED state.

According to one aspect of the present application, comprising:

the first message comprising a first threshold; the first condition set comprising that a first bit set with a data volume not less than a first threshold, and the first bit set comprising the first bit group.

According to one aspect of the present application, comprising:

when the first transmission mode is the transmission through sidelink, the first bit group is transmitted through a first RLC bearer; when the first transmission mode is the transmission through cellular link, the first bit group is transmitted through a third RLC bearer;

herein, the first RLC bearer and the third RLC bearer respectively correspond to a target bearer; the first bit group belongs to the target bearer.

According to one aspect of the present application, comprising:

transmitting a second bit group through sidelink before receiving the first message; and receiving a second message before transmitting the second bit group; receiving a third message through sidelink before receiving the first message and after transmitting the second bit group;

herein, the second message configures the first RLC bearer; the third message configures the third RLC bearer; the third message indicates that the first node enters into RRC_INACTIVE state.

According to one aspect of the present application, comprising:

the third message being transmitted before the fourth message; the fourth message being used to indicate that the first RLC bearer is suspended.

According to one aspect of the present application, comprising:

the fourth message being used to indicate that a second RLC bearer is suspended;

herein, a fourth RLC bearer set is mapped to the second RLC bearer; the fourth RLC bearer set comprises the first RLC bearer; all RLC bearers in the fourth RLC bearers set are suspended; the second RLC bearer corresponds to the target bearer.

The present application provides a first node for wireless communications, comprising:

a first receiver, receiving a first message through sidelink; determining a first transmission mode based on at least the first message; and a first transmitter, transmitting a first bit group by adopting the first transmission mode, the first bit group comprising at least one bit;

herein, the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied, the candidate transmission mode set comprises a candidate transmission mode of a transmission through sidelink.

The present application provides a method in a second node for wireless communications, comprising:

transmitting a first message through sidelink; transmitting a third bit group through cellular link; and receiving a first bit group through sidelink, the first bit group comprising at least one bit;

herein, at least the first message is used to determine a first transmission mode; the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied, the candidate transmission mode set comprises a candidate transmission mode of a transmission through sidelink; the third bit group comprises the first bit group.

According to one aspect of the present application, comprising:

the first condition set comprising that the first message comprises RRC_CONNECTED state.

According to one aspect of the present application, comprising:

the first message comprising a first threshold; the first condition set comprising that a first bit set with a data volume not less than a first threshold, and the first bit set comprising the first bit group.

According to one aspect of the present application, comprising:

the first bit group being received through a first RLC bearer; herein, the first RLC bearer corresponds to a target bearer; the first bit group belongs to the target bearer.

According to one aspect of the present application, comprising:

receiving a second bit group through sidelink before transmitting the first message; receiving fifth and sixth message through cellular link; and transmitting a second message before receiving the second bit group; transmitting third message through sidelink before transmitting the first message and after receiving the second bit group; transmitting a fourth bit group through cellular link after receiving the fifth message and before receiving the sixth message;

herein, the fifth message is used to generate the second message; the fifth message configures the first RLC bearer and the second RLC bearer; the sixth message generates the third message; the third message configures a third RLC bearer; the third message indicates that a receiver of the first message enters into RRC_INACTIVE state; the fourth bit group comprises the second bit group.

According to one aspect of the present application, comprising:

receiving fourth message through cellular link;

herein, the sixth message is received before the fourth message; the fourth message indicates that the first RLC bearer is suspended.

According to one aspect of the present application, comprising:

the fourth message being used to indicate that a second RLC bearer is suspended;

herein, a fourth RLC bearer set is mapped to the second RLC bearer; the fourth RLC bearer set comprises the first RLC bearer; all RLC bearers in the fourth RLC bearers set are suspended; the second RLC bearer corresponds to the target bearer.

The present application provides a second node for wireless communications, comprising:

a second transmitter, transmitting a first message through sidelink; transmitting a third bit group through cellular link; and a second receiver, receiving a first bit group through sidelink, the first bit group comprising at least one bit;

herein, at least the first message is used to determine a first transmission mode; the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied, the candidate transmission mode set comprises a candidate transmission mode of a transmission through sidelink; the third bit group comprises the first bit group.

The present application provides a method in a third node for wireless communications, comprising:

transmitting sixth message through cellular link; and receiving a first bit group through cellular link, the first bit group comprising at least one bit;

herein, the sixth message is used to generate third message; the third message is used to configure a third RLC bearer; the third message is used to indicate entering into RRC_INACTIVE state; the first bit group is received through the third RLC bearer; the third RLC bearer corresponds to a target bearer; the first bit group belongs to the target bearer.

According to one aspect of the present application, comprising:

transmitting fourth message through cellular link;

herein, the sixth message is transmitted before the fourth message; the fourth message indicates that a first RLC bearer is suspended; the first RLC bearer corresponds to the target bearer.

According to one aspect of the present application, comprising:

the fourth message being used to indicate that a second RLC bearer is suspended; herein, a fourth RLC bearer set is mapped to the second RLC bearer; the fourth RLC bearer set comprises the first RLC bearer; all RLC bearers in the fourth RLC bearers set are suspended; the second RLC bearer corresponds to the target bearer.

According to one aspect of the present application, comprising:

transmitting fifth message through cellular link before transmitting the sixth message; and receiving a fourth bit group after transmitting the fifth message and before transmitting the sixth message;

herein, the fifth message configures the first RLC bearer and the second RLC bearer.

The present application provides a third node for wireless communications, comprising:

a third transmitter, transmitting sixth message through cellular link; and a third receiver, receiving a first bit group through cellular link, the first bit group comprising at least one bit;

herein, the sixth message is used to generate third message; the third message is used to configure a third RLC bearer; the third message is used to indicate entering into RRC_INACTIVE state; the first bit group is received through the third RLC bearer; the third RLC bearer corresponds to a target bearer; the first bit group belongs to the target bearer.

The present application provides a method in a first node for wireless communications, comprising:

receiving a first message through sidelink, and determining a first target RRC state based on at least the first message; receiving a first bit set through sidelink; and transmitting a second message; generating a second bit set, transmitting the second bit set through cellular link, and the second bit set comprising the first bit set;

herein, the first target RRC state is one of RRC_INACTIVE state and RRC_CONNECTED state; the second message is used to indicate the first target RRC state.

In one embodiment, the present application is applicable to wireless communications adopting relay mode; and the relay mode comprises at least one of L2 relay or L3 relay.

In one embodiment, the present application is applicable to UE-to-Network relay transmission.

In one embodiment, a problem to be solved in the present application is: how to effectively transmit data between a source node and a relay node in different RRC states, avoiding excessive the signaling overhead, and reducing the efficiency of wireless communication systems.

In one embodiment, solutions of the present application include: the relay node determines performing L2 or L3 relay transmission in RRC_INACTIVE state or RRC_CONNECTED state through receiving message transmitted by a source node.

In one embodiment, beneficial effects of the present application include: the relay node flexibly determines RRC state and selects a relay mode based on received source node message, which can effectively improve the signaling overhead of data transmission between the relay node and the source node, while reducing the power consumption of the relay node and the source node.

According to one aspect of the present application, comprising:

for the RRC_INACTIVE state and the RRC_CONNECTED state, only when the first target RRC state is the RRC_INACTIVE state, the behavior of generating the second bit set comprising generating at least one PDCP PDU header, the second bit set comprising the at least one PDCP PDU header, and any PDCP PDU header in the at least one PDCP PDU header comprising a PDCP sequence number.

According to one aspect of the present application, comprising:

transmitting third message through sidelink;

herein, the second message is transmitted through cellular link, and the third message is used to indicate that a transmitter of the first message enters into or maintains the first target RRC state.

According to one aspect of the present application, comprising:

transmitting fourth message through cellular link;

herein, the second message is transmitted through sidelink, and the fourth message is used to indicate that the first node enters into or maintains the first target RRC state.

According to one aspect of the present application, comprising:

receiving a third bit set through sidelink before receiving the first message, and receiving fifth message through cellular link before receiving the first message and after a fourth bit set being transmitted; and generating and transmitting the fourth bit set through cellular link before receiving the first message, the fourth bit set comprising the third bit set;

herein, the fifth message is used to indicate that the first node enters into a second target RRC state, and the first node is in the second target RRC state when receiving the first message, the second target RRC state is either the RRC_INACTIVE state or the RRC_CONNECTED state, and the second target RRC state is different from the first target RRC state; only one of the behavior of generating a second bit set and the behavior of generating a fourth bit set being in the RRC_INACTIVE state comprises generating at least one PDCP PDU header, a corresponding bit set comprises the at least one PDCP PDU header, and any PDCP PDU header in the at least one PDCP PDU header comprises a PDCP sequence number; the fourth bit set and the second bit set are transmitted through a same RLC bearer.

According to one aspect of the present application, comprising:

receiving a sixth message through cellular link;

herein, the sixth message and the first message are used to determine the first target RRC state.

According to one aspect of the present application, comprising:

transmitting a seventh message through sidelink;

herein, the seventh message is used to generate the first message.

The present application provides a first node for wireless communications, comprising:

a first receiver, receiving a first message through sidelink, and determining a first target RRC state based on at least the first message; receiving a first bit set through sidelink; and a first transmitter, transmitting a second message; and generating a second bit set, transmitting the second bit set through cellular link, the second bit set comprising the first bit set;

herein, the first target RRC state is one of RRC_INACTIVE state and RRC_CONNECTED state; the second message is used to indicate the first target RRC state.

The present application provides a method in a second node for wireless communications, comprising:

transmitting a first message through sidelink, at least the first message being used to determine a first target RRC state; transmitting a first bit set through sidelink;

herein, second message is transmitted; a second bit set is generated, and the second bit set is transmitted through cellular link, and the second bit set comprises the first bit set; the first target RRC state is one of RRC_INACTIVE state and RRC_CONNECTED state; the second message is used to indicate the first target RRC state.

According to one aspect of the present application, comprising:

for the RRC_INACTIVE state and the RRC_CONNECTED state, only when the first target RRC state is the RRC_INACTIVE state, the second bit set being generated comprising that at least one PDCP PDU header is generated, the second bit set comprising at least one PDCP PDU header, and any PDCP PDU header in the at least one PDCP PDU header comprising a PDCP sequence number.

According to one aspect of the present application, comprising:

receiving third message through sidelink;

herein, the second message is transmitted through cellular link, and the third message is used to indicate that the second node enters into or maintains the first target RRC state.

According to one aspect of the present application, comprising:

receiving the second message through sidelink;

herein, fourth message is transmitted through cellular link; the fourth message is used to indicate that a receiver of the first message enters into or maintains the first target RRC state.

According to one aspect of the present application, comprising:

transmitting a third bit set through sidelink before transmitting the first message, before transmitting the first message and after a fourth bit set being transmitted, fifth message being received through cellular link;

herein, the fourth bit set is generated and transmitted through cellular link before transmitting the first message, and the fourth bit set comprises the third bit set; the fifth message is used to indicate that the receiver of the first message enters into a second target RRC state, and the receiver of the first message is in the second target RRC state when receiving the first message, the second target RRC state is either the RRC_INACTIVE state or the RRC_CONNECTED state, and the second target RRC state is different from the first target RRC state; only one of the second bit set being generated and the fourth bit set being generated being in the RRC_INACTIVE state comprises at least one PDCP PDU being generated, and a corresponding bit set comprises the at least one PDCP PDU header, and any PDCP PDU header in the at least one PDCP PDU comprises a PDCP sequence number; the fourth bit set and the second bit set are transmitted through a same RLC bearer.

According to one aspect of the present application, comprising:

sixth message being received through cellular link;

herein, the sixth message and the first message are used to determine the first target RRC state.

According to one aspect of the present application, comprising:

receiving a seventh message through sidelink;

herein, the seventh message is used to generate the first message.

The present application provides a second node for wireless communications, comprising:

a second transmitter, transmitting a first message through sidelink, at least the first message being used to determine a first target RRC state; transmitting a first bit set through sidelink;

herein, second message is transmitted; a second bit set is generated, and the second bit set is transmitted through cellular link, and the second bit set comprises the first bit set; the first target RRC state is one of RRC_INACTIVE state and RRC_CONNECTED state; the second message is used to indicate the first target RRC state.

The present application provides a method in a first node for wireless communications, comprising: receiving a first message through sidelink; receiving a sixth message through cellular link; receiving a first bit set through sidelink; and transmitting a seventh message through sidelink; transmitting a second message; generating a second bit set, transmitting the second bit set through cellular link, and the second bit set comprising the first bit set;

herein, the sixth message is used to generate the seventh message; the seventh message is used to generate the first message; the second message is used to indicate a first target RRC state, and the first target RRC state is one of RRC_INACTIVE state and RRC_CONNECTED state.

According to one aspect of the present application, comprising:

for RRC_INACTIVE state and the RRC_CONNECTED state, only when the first target RRC state is the RRC_INACTIVE state, the behavior of generating the second bit set comprising generating at least one PDCP PDU header, the second bit set comprising the at least one PDCP PDU header, and any PDCP PDU header in the at least one PDCP PDU header comprising a PDCP sequence number.

According to one aspect of the present application, comprising:

transmitting third message through sidelink;

herein, the second message is transmitted through cellular link, and the third message is used to indicate that a transmitter of the first message enters into or maintains the first target RRC state.

According to one aspect of the present application, comprising:

transmitting fourth message through cellular link;

herein, the second message is transmitted through sidelink, and the fourth message is used to indicate that the first node enters into or maintains the first target RRC state.

According to one aspect of the present application, comprising:

receiving a third bit set through sidelink before receiving the first message, and receiving fifth message through cellular link before receiving the first message and after a fourth bit set being transmitted; and generating and transmitting the fourth bit set through cellular link before receiving the first message, the fourth bit set comprising the third bit set;

herein, the fifth message is used to indicate that the first node enters into a second target RRC state, and the first node is in the second target RRC state when receiving the first message, the second target RRC state is either the RRC_INACTIVE state or the RRC_CONNECTED state, and the second target RRC state is different from the first target RRC state; only one of the behavior of generating a second bit set and the behavior of generating a fourth bit set being in the RRC_INACTIVE state comprises generating at least one PDCP PDU header, a corresponding bit set comprises the at least one PDCP PDU header, and any PDCP PDU header in the at least one PDCP PDU header comprises a PDCP sequence number; the fourth bit set and the second bit set are transmitted through a same RLC bearer.

According to one aspect of the present application, comprising:

the sixth message and the first message being used to determine the first target RRC state.

According to one aspect of the present application, comprising:

the sixth message indicating an available relay mode; the seventh message indicating a supported relay mode;

herein, the available relay mode indicated by the sixth message comprises the supported relay mode indicated by the seventh message.

The present application provides a first node for wireless communications, comprising:

a first receiver, receiving a first message through sidelink; receiving a sixth message through cellular link;

receiving a first bit set through sidelink; and a first transmitter, transmitting a seventh message through sidelink; transmitting a second message;

generating a second bit set, transmitting the second bit set through cellular link, and the second bit set comprising the first bit set;

herein, the sixth message is used to generate the seventh message; the seventh message is used to generate the first message; the second message is used to indicate a first target RRC state, and the first target RRC state is one of RRC_INACTIVE state and RRC_CONNECTED state.

The present application provides a method in a second node for wireless communications, comprising:

transmitting a first message through sidelink; transmitting a first bit set through sidelink; and receiving a seventh message through sidelink;

herein, sixth message is received through cellular link; the sixth message is used to generate the seventh message; the seventh message is used to generate the first message; second message is transmitted; a second bit set is generated, and the second bit set is transmitted through cellular link, and the second bit set comprises the first bit set; the second message is used to indicate a first target RRC state, and the first target RRC state is one of RRC_INACTIVE state and RRC_CONNECTED state.

According to one aspect of the present application, comprising:

for the RRC_INACTIVE state and the RRC_CONNECTED state, only when the first target RRC state is the RRC_INACTIVE state, the second bit set being generated comprising that at least one PDCP PDU header is generated, the second bit set comprising at least one PDCP PDU header, and any PDCP PDU header in the at least one PDCP PDU header comprising a PDCP sequence number.

According to one aspect of the present application, comprising:

receiving third message through sidelink;

herein, the second message is transmitted through cellular link, and the third message is used to indicate that the second node enters into or maintains the first target RRC state.

According to one aspect of the present application, comprising:

receiving the second message through sidelink;

herein, fourth message is transmitted through cellular link; the fourth message is used to indicate that a receiver of the first message enters into or maintains the first target RRC state.

According to one aspect of the present application, comprising:

transmitting a third bit set through sidelink before transmitting the first message, before transmitting the first message and after a fourth bit set being transmitted, fifth message being received through cellular link;

herein, the fourth bit set is generated and transmitted through cellular link before transmitting the first message, and the fourth bit set comprises the third bit set; the fifth message is used to indicate that the receiver of the first message enters into a second target RRC state, and the receiver of the first message is in the second target RRC state when receiving the first message, the second target RRC state is either the RRC_INACTIVE state or the RRC_CONNECTED state, and the second target RRC state is different from the first target RRC state; only one of the second bit set being generated and the fourth bit set being generated being in the RRC_INACTIVE state comprises at least one PDCP PDU being generated, and a corresponding bit set comprises the at least one PDCP PDU header, and any PDCP PDU header in the at least one PDCP PDU comprises a PDCP sequence number; the fourth bit set and the second bit set are transmitted through a same RLC bearer.

According to one aspect of the present application, comprising:

the sixth message and the first message being used to determine the first target RRC state.

According to one aspect of the present application, comprising:

the sixth message indicating an available relay mode; the seventh message indicating a supported relay mode;

herein, the available relay mode indicated by the sixth message comprises the supported relay mode indicated by the seventh message.

The present application provides a second node for wireless communications, comprising:

a second transmitter, transmitting a first message through sidelink; transmitting a first bit set through sidelink; and a second receiver, receiving a seventh message through sidelink;

herein, sixth message is received through cellular link; the sixth message is used to generate the seventh message; the seventh message is used to generate the first message; second message is transmitted; a second bit set is generated, and the second bit set is transmitted through cellular link, and the second bit set comprises the first bit set; the second message is used to indicate a first target RRC state, and the first target RRC state is one of RRC_INACTIVE state and RRC_CONNECTED state.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1A

Figure 1A:
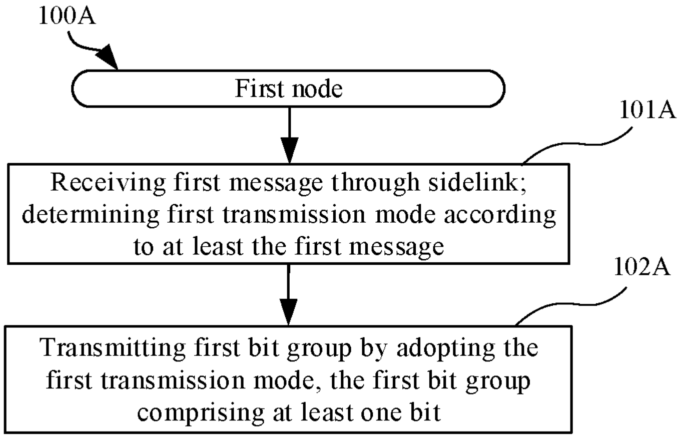
FIG. 1A illustrates a flowchart of transmission of a first node according to one embodiment of the present application.

Embodiment 1A illustrates a flowchart of transmission of a first node according to one embodiment of the present application, as shown in FIG. 1A.

In embodiment 1A, the first node 100A receives a first message through sidelink in step 101A; determines a first transmission mode based on at least the first message; transmits a first bit group by adopting the first transmission mode in step 102A, the first bit group comprises at least one bit; herein, the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied, the candidate transmission mode set comprises a candidate transmission mode of a transmission through sidelink.

In one embodiment, the first node is in the RRC_INACTIVE state when receiving the first message.

In one embodiment, after receiving the first message and before transmitting the first bit group, the first node does not receive message indicating an RRC state of the transmitter of the first message through sidelink.

In one embodiment, the first message indicates an RRC state in which the transmitter of the first message is located closest to the behavior of transmitting the first bit group.

In one embodiment, the sidelink belongs to a PC5 air interface.

In one embodiment, the first message is received at a PC5-RRC sublayer.

In one embodiment, the first message is a PC5-RRC message.

In one embodiment, the first message comprises all or partial Information Element (IEs) in a PC5-RRC message.

In one embodiment, the first message comprises all or partial fields in an IE in a PC5-RRC message.

In one embodiment, a name of the first message comprises relay.

In one embodiment, the first message comprises RRCReconfigurationRelay.

In one embodiment, the first message comprises RRCReconfigurationSidelink.

In one embodiment, the first message comprises RelayAssistantInformation.

In one embodiment, the first message is used to indicate a first condition set, and the first condition set comprises at least one condition.

In one embodiment, the first condition set comprises that the first message indicates a candidate transmission mode transmitted through sidelink.

In one embodiment, the phrase that the first condition set comprises that the first message indicates a candidate transmission mode transmitted through sidelink comprises: the first condition set comprises that the first message comprises a candidate transmission mode transmitted through sidelink.

In one embodiment, the phrase that the first condition set comprises that the first message indicates a candidate transmission mode transmitted through sidelink comprises: the first condition set comprises that allowing the transmission through sidelink comprised in the first message to be set to Yes.

In one embodiment, the phrase that the first condition set comprises that the first message indicates a candidate transmission mode transmitted through sidelink comprises: the first condition set comprises that the transmission through sidelink comprised in the first message is set to allowed.

In one embodiment, when condition(s) in the first condition set is(are) satisfied, the candidate transmission mode set comprises a candidate transmission mode of a transmission through sidelink.

In one embodiment, when any condition in the first condition set is satisfied, the candidate transmission mode set does not comprise a candidate transmission mode transmitted through sidelink.

In one embodiment, the first transmission mode is determined according to at least the first message.

In one embodiment, the first transmission mode is determined based on at least a first one of the first message, a data volume of a first bit set or a channel state; the channel state comprises at least one of a cellular link channel state or a sidelink channel state.

In one embodiment, the data volume of the first bit set is a number of all bits comprised in the first bit set.

In one embodiment, the data volume of the first bit set is represented in bit.

In one embodiment, the data volume of the first bit set is represented in byte.

In one embodiment, the channel state comprises Reference Signal Received Power (RSRP).

In one embodiment, the channel state comprises Reference Signal Received Quality (RSRQ).

In one embodiment, the channel state comprises a Received Signal Strength Indicator (RSSI).

In one embodiment, the channel state comprises PathLoss (PL).

In one embodiment, the cellular link channel state is the channel state between the first node and a serving base station of the first node.

In one embodiment, the sidelink channel state is the channel state between the first node and a transmitter of the first message.

In one embodiment, the first node obtains the channel state through measurement.

In one embodiment, the first node receives the channel state transmitted by the serving base station of the first node.

In one embodiment, the first node receives the channel state transmitted by the transmitter of the first message.

In one embodiment, a first bit group is transmitted by adopting the first transmission mode.

In one embodiment, the first transmission mode is one transmission mode in a candidate transmission mode set, the candidate transmission mode set comprises a transmission through cellular link and a transmission through sidelink.

In one embodiment, the cellular link is uplink.

In one embodiment, the cellular link is downlink.

In one embodiment, the cellular link belongs to a Uu air interface.

In one embodiment, the transmission through cellular link comprises the first node transmitting to a serving base station of the first node through cellular link.

In one embodiment, the transmission through sidelink comprises that the first node transmits to a transmitter of the first message through sidelink.

In one embodiment, the first bit group comprises at least one bit.

In one embodiment, the first bit group comprises at least one byte.

In one embodiment, the first bit group comprises a positive integer number of bit(s).

In one embodiment, the first bit group comprises at least one Radio Link Control (RLC) Service Data Unit (SDU).

In one embodiment, the first bit group comprises at least one Packet Data Convergence Protocol (PDCP) SDU.

In one embodiment, the first bit group comprises at least one Medium Access Control (MAC) SDU.

In one embodiment, the first bit group comprises at least one MAC Protocol Data Unit (PDU).

In one embodiment, a data volume of the first bit group does not exceed a second threshold.

In one embodiment, the second threshold is configured by network.

In one embodiment, the second threshold is pre-configured.

In one embodiment, the second threshold is a fixed value.

In one embodiment, the second threshold is standard specified.

In one embodiment, the second threshold is represented in byte.

Embodiment 1B

Figure 1B:
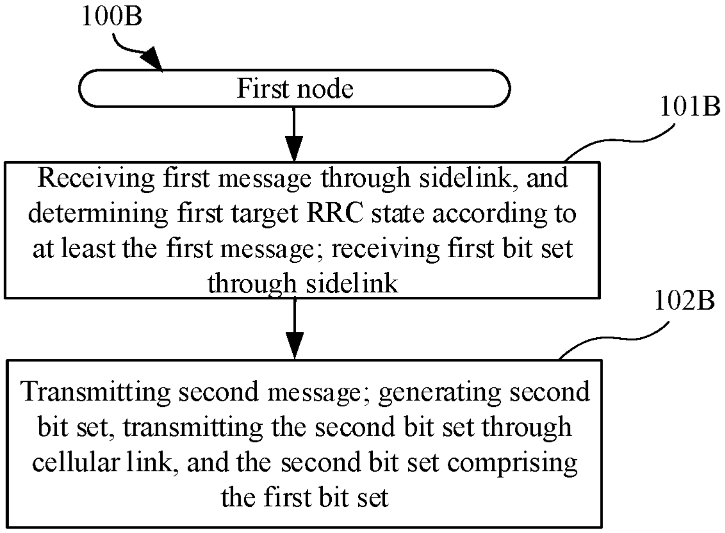
FIG. 1B illustrates a flowchart of transmission of a first node according to one embodiment of the present application.

Embodiment 1B illustrates a flowchart of transmission of a first node according to one embodiment of the present application, as shown in FIG. 1B.

In embodiment 1B, the first node 100B receives a first message through sidelink in step 101B, and determines a first target RRC state based on at least the first message; receives a first bit set through sidelink; transmits a second message in step 102B; generates a second bit set, transmits the second bit set through cellular link, and the second bit set comprises the first bit set; herein, the first target RRC state is one of RRC_INACTIVE state and RRC_CONNECTED state; the second message is used to indicate the first target RRC state.

In one embodiment, the first node is in the RRC_INACTIVE state when receiving the first message.

In one embodiment, the sidelink belongs to a PC5 air interface.

In one embodiment, the first message is generated at a PC5-RRC sublayer.

In one embodiment, the first message comprises a PC5-RRC message.

In one embodiment, the first message comprises all or partial IEs in a PC5-RRC message.

In one embodiment, the first message comprises all or partial fields in an IE in a PC5-RRC message.

In one embodiment, the first message explicitly indicates relay mode.

In one embodiment, the first message implicitly indicates relay mode.

In one embodiment, the first message carries relay mode.

In one embodiment, the relay mode comprises at least one of L2 relay or L3 relay.

In one embodiment, the first message carries at least one bearer identity; the at least one bearer identified by the at least one bearer is configured with the relay mode; any of the at least one bearer is either a signaling radio bearer or a data radio bearer.

In one embodiment, the first message carries at least one bearer identity; at least one bearer identified by the at least one bearer is configured with Small Data Transmission (SDT); any of the at least one bearer is a data radio bearer.

In one embodiment, the bearer is a radio bearer (RB).

In one embodiment, the bearer is an Evolved Packet Switched System (EPS) bearer.

In one embodiment, the bearer is a E-UTRAN radio access bearer (E-RAB) bearer.

In one embodiment, the bearer is indicated by a Logical Channel Identity (LCID).

In one embodiment, the first message carries at least one Quality of Service (QoS) parameter set; the at least one QoS parameter set is applied to a transmission of the relay mode.

In one embodiment, the first message carries at least one QoS parameter set; the at least one QoS parameter set is applied to an SDT transmission.

In one embodiment, the first message belongs to a PC5 signaling.

In one embodiment, the PC5 signaling comprises a PC5-S signaling.

In one embodiment, the PC5 signaling comprises a PC5-RRC signaling.

In one embodiment, the PC5 signaling comprises a Discovery signaling.

In one embodiment, the first message belongs to a Uu signaling.

In one embodiment, the Uu signaling comprises an RRC signaling.

In one embodiment, the first message comprises an RRCResumeRequest.

In one embodiment, the first message comprises an RRCResumeRequest1.

In one embodiment, the first message comprises an RRCResumeRequest_Relay.

In one embodiment, the first message comprises an RRCResumeRequest1_Relay.

In one embodiment, the first message comprises an RRC-SetupRequest.

In one embodiment, the first message comprises RRC-SetupRequest_Relay.

In one embodiment, the first message comprises a Discovery message.

In one embodiment, a name of the first message comprises relay.

In one embodiment, the first message indicates the relay mode.

In one embodiment, the first message belongs to a Signaling Radio Bearer.

In one embodiment, the signaling radio bearer is a Sidelink-Signaling Radio Bearer.

In one embodiment, the signaling radio bearer is a Uu signaling radio bearer.

In one embodiment, the signaling radio bearer is used to transmit a PC5 Signaling (PC5-S) message.

In one embodiment, the signaling radio bearer is used to transmit a PC5-Radio Resource Control (PC5-RRC) message.

In one embodiment, the signaling radio bearer is used to transmit an RRC message.

In one embodiment, the signaling radio bearer is used to transmit a Discovery message.

In one embodiment, the signaling radio bearer comprises SL-SRB0.

In one embodiment, the signaling radio bearer comprises SL-SRB1.

In one embodiment, the signaling radio bearer comprises SL-SRB2.

In one embodiment, the signaling radio bearer comprises SL-SRB3.

In one embodiment, the signaling radio bearer comprises SL-SRB4.

In one embodiment, the signaling radio bearer comprises SRB0.

In one embodiment, the first message is transmitted through default L2 configuration (default RLC configuration).

In one embodiment, the first message is transmitted through a pre-configured L2 configuration.

In one embodiment, the first message is transmitted through a specified L2 configuration.

In one embodiment, the first bit set belongs to a data radio bearer (DRB).

In one embodiment, the first node determines the first target RRC state based on the first message.

In one embodiment, the first target RRC state is either the RRC_INACTIVE state or the RRC_CONNECTED state.

In one embodiment, the first node determines the first target RRC state based on the relay mode indicated by the first message.

In one embodiment, when the relay mode indicated by the first message is at least a former of the L2 relay or the L3 relay, the first target RRC state is determined as the RRC_CONNECTED state.

In one embodiment, when the relay mode indicated by the first message is the L3 relay, the first target RRC state is determined as the RRC_CONNECTED state.

In one embodiment, when the relay mode indicated by the first message is the L3 relay, the first target RRC state is determined as the RRC_INACTIVE state.

In one embodiment, the first node determines the first target RRC state based on signaling type comprised in the first message; the signaling type comprises either a PC5 signaling or a Uu signaling.

In one embodiment, when the first message is a PC5 signaling, the first target RRC state is determined as the RRC_CONNECTED state.

In one embodiment, when the first message is a PC5 signaling, the first target RRC state is determined as the RRC_INACTIVE state.

In one embodiment, when the first message is a Uu signaling, the first target RRC state is determined as the RRC_CONNECTED state.

In one embodiment, when the first message is a Uu signaling, the first target RRC state is determined as the RRC_INACTIVE state.

In one embodiment, when the first message is either RRCResumeRequest or RRCResumeRequest1, it is determined that the first target RRC state is the RRC_CONNECTED state.

In one embodiment, when the first message is either RRCResumeRequest or RRCResumeRequest1, it is determined that the first target RRC state is the RRC_INACTIVE state.

In one embodiment, when the first message is RRCSetupRequest, the first target RRC state is determined as the RRC_CONNECTED state.

In one embodiment, when the first message is unicast, the first target RRC state is determined as the RRC_CONNECTED state; the first message comprises a Destination Layer-2 ID; the Destination Layer-2 ID is a Proximity Service User Equipment Identity (ProSe UE ID) of the first node.

In one embodiment, when the first message is groupcast, the first target RRC state is determined as the RRC_CONNECTED state.

In one embodiment, when the first message is groupcast, the first target RRC state is determined as the RRC_INACTIVE state.

In one embodiment, when the first message is broadcast, the first target RRC state is determined as the RRC_CONNECTED state.

In one embodiment, when the first message is broadcast, the first target RRC state is determined as the RRC_INACTIVE state.

In one embodiment, when the first message is groupcast, the first message comprises a Proximity Service Layer-2 Group Identity (ProSe Layer-2 Group ID).

In one embodiment, the first node determines the first target RRC state based on whether the first bit set is unicast.

In one embodiment, when the first bit set is the unicast, it is determined that the first target RRC state is the RRC_CONNECTED state.

In one embodiment, when the first bit set is one of groupcast or broadcast, it is determined that the first target RRC state is the RRC_INACTIVE state.

In one embodiment, the first node determines the first target RRC state based on RRC state in which the first message is received and the first message.

In one embodiment, the first node determines the first target RRC state based on RRC state in which the first message is received and the relay mode indicated by the first message.

In one embodiment, when RRC state in which the first message is received is the RRC_CONNECTED state and the relay mode indicated by the first message is at least one of the L2 relay or L3 relay, it is determined that the first target RRC state is the RRC_CONNECTED state.

In one embodiment, when RRC state in which the first message is received is the RRC_INACTIVE state and the relay mode indicated by the first message is at least a former of the L2 relay or the L3 relay, it is determined that the first target RRC state is the RRC_CONNECTED state.

In one embodiment, when RRC state in which the first message is received is the RRC_INACTIVE state and the relay mode indicated by the first message is the L3 relay, it is determined that the first target RRC state is the RRC_CONNECTED state.

In one embodiment, when RRC state in which the first message is received is the RRC_INACTIVE state and the relay mode indicated by the first message is the L3 relay, it is determined that the first target RRC state is the RRC_INACTIVE state.

In one embodiment, the first node determines the first target RRC state based on RRC state in which when the first message is received and a signaling type comprised in the first message; the signaling type comprises either a PC5 signaling or a Uu signaling.

In one embodiment, when RRC state in which the first message is received is the RRC_CONNECTED state and the signaling type comprised in the first message is either the PC5 signaling or the Uu signaling, it is determined that the first target RRC state is the RRC_CONNECTED state.

In one embodiment, when RRC state in which the first message is received is the RRC_INACTIVE state and the signaling type comprised in the first message is the PC5 signaling, it is determined that the first target RRC state is the RRC_CONNECTED state.

In one embodiment, when RRC state in which the first message is received is the RRC_INACTIVE state and the signaling type comprised in the first message is the PC5 signaling, it is determined that the first target RRC state is the RRC_INACTIVE state.

In one embodiment, when RRC state in which the first message is received is the RRC_INACTIVE state and the signaling type comprised in the first message is the Uu signaling, it is determined that the first target RRC state is the RRC_CONNECTED state.

In one embodiment, when RRC state in which the first message is received is the RRC_INACTIVE state and the signaling type comprised in the first message is the Uu signaling, it is determined that the first target RRC state is the RRC_INACTIVE state.

In one embodiment, when RRC state in which the first message is received is the RRC_CONNECTED state and the first message is RRCSetupRequest, it is determined that the first target RRC state is the RRC_CONNECTED state.

In one embodiment, when RRC state in which the first message is received is the RRC_INACTIVE state and the first message is RRCSetupRequest, it is determined that the first target RRC state is the RRC_CONNECTED state.

In one embodiment, when RRC state in which the first message is received is the RRC_CONNECTED state and the first message is one of RRCResumeRequest or RRCResumeRequest1, it is determined that the first target RRC state is the RRC_CONNECTED state.

In one embodiment, when RRC state in which the first message is received is the RRC_INACTIVE state and the first message is one of RRCResumeRequest or RRCResumeRequest1, it is determined that the first target RRC state is the RRC_CONNECTED state.

In one embodiment, when RRC state in which the first message is received is the RRC_INACTIVE state and the first message is one of RRCResumeRequest or RRCResumeRequest1, it is determined that the first target RRC state is the RRC_INACTIVE state.

In one embodiment, the first node determines the first target RRC state based on RRC state in which the first message is received, the first message and the first bit set.

In one embodiment, when three conditions of RRC state in which the first message is received being the RRC_INACTIVE state, the first message being either RRCResumeRequest or RRCResumeRequest1, and a data volume comprised in the first bit set exceeding a first threshold are satisfied, it is determined that the first target RRC state is the RRC_CONNECTED state.

In one embodiment, when three conditions of RRC state in which the first message is received being the RRC_INACTIVE state, the first message being either RRCResumeRequest or RRCResumeRequest1, and a data volume comprised in the first bit set not exceeding a first threshold are satisfied, it is determined that the first target RRC state is the RRC_INACTIVE state.

In one embodiment, when three conditions of RRC state in which the first message is received being the RRC_CONNECTED state, the first message being either RRCResumeRequest or RRCResumeRequest1, and a data volume comprised in the first bit set exceeding a first threshold are satisfied, it is determined that the first target RRC state is the RRC_CONNECTED state.

In one embodiment, when three conditions of RRC state in which the first message is received being the RRC_CONNECTED state, the first message being either RRCResumeRequest or RRCResumeRequest1, and a data volume comprised in the first bit set not exceeding a first threshold are satisfied, it is determined that the first target RRC state is the RRC_CONNECTED state.

In one embodiment, the first threshold is configured by network.

In one embodiment, the first threshold is pre-configured.

In one embodiment, the first threshold is a fixed value.

In one embodiment, the first threshold is standard specified.

In one embodiment, the first node determines the first target RRC state based on the first message and the first bit set.

In one embodiment, the first target RRC state is used to determine whether the behavior of generating a second bit set comprises generating a Packet Data Convergence Protocol (PDCP) Protocol Data Unit (PDU) header.

In one embodiment, when the first target RRC state is the RRC_CONNECTED state, it is determined that the behavior of generating a second bit set does not comprise generating the PDCP PDU header.

In one embodiment, when the first target RRC state is the RRC_INACTIVE state, it is determined that the behavior of generating a second bit set comprises generating the PDCP PDU header.

In one embodiment, the first target RRC state is used to determine whether the behavior of generating a second bit set comprises generating a PDCP PDU header.

In one embodiment, the first node determines whether the behavior of generating a second bit set comprises generating a PDCP PDU header based on RRC state in which the first message is received and the first target RRC state.

In one embodiment, when RRC state in which the first message is received is the RRC_CONNECTED state and the first target RRC state is the RRC_CONNECTED state, it is determined that the behavior of generating a second bit set comprises generating the PDCP PDU header.

In one embodiment, when RRC state in which the first message is received is the RRC_CONNECTED state and the first target RRC state is the RRC_CONNECTED state, it is determined that the behavior of generating a second bit set does not comprise generating the PDCP PDU header.

In one embodiment, when RRC state in which the first message is received is the RRC_INACTIVE state and the first target RRC state is the RRC_CONNECTED state, it is determined that the behavior of generating a second bit set comprises generating the PDCP PDU header.

In one embodiment, when RRC state in which the first message is received is the RRC_INACTIVE state and the first target RRC state is the RRC_CONNECTED state, it is determined that the behavior of generating a second bit set does not comprise generating the PDCP PDU header.

In one embodiment, when RRC state in which the first message is received is the RRC_INACTIVE state and the first target RRC state is the RRC_INACTIVE state, it is determined that the behavior of generating a second bit set comprises generating the PDCP PDU header.

In one embodiment, the second message is transmitted through sidelink.

In one subembodiment of the above embodiment, the second message is used to indicate that a transmitter of the first message enters into the first target RRC state.

In one embodiment, the second message is transmitted through cellular link.

In one subembodiment of the above embodiment, the second message is used to request that the first node enters into the first target RRC state.

In one subembodiment of the above embodiment, the second message is used to request that a transmitter of the first message enters into the first target RRC state.

In one subembodiment of the above embodiment, the second message is used to request that the first node enters into the first target RRC state as well as request that a transmitter of the first message enters into the first target RRC state.

In one embodiment, the second message belongs to a PC5 signaling; the PC5 signaling comprises either a PC5-S signaling or a PC5-RRC signaling.

In one embodiment, the second message belongs to a Uu signaling; the Uu signaling comprises an RRC signaling.

In one embodiment, the second message is RRCResumeRequest.

In one embodiment, the second message is RRCResumeRequest1.

In one embodiment, the second message comprises RRCResume_Relay.

In one embodiment, the second message is RRCSetupRequest.

In one embodiment, the second message comprises RRCSetup_Relay.

In one embodiment, the second message belongs to the Signaling Radio Bearer.

In one embodiment, the second message is used to trigger a transmission of the first bit set.

In one embodiment, the second bit set is generated and the second bit set is transmitted through cellular link.

In one embodiment, the cellular link is uplink.

In one embodiment, the cellular link is downlink.

In one embodiment, the cellular link belongs to a Uu air interface.

In one embodiment, the second bit set comprises the first bit set.

In one embodiment, the second bit set belongs to a data radio bearer.

In one embodiment, the second bit set comprises at least one byte other than the first bit set.

In one embodiment, the first bit set and the second bit set respectively comprise at least one byte.

In one embodiment, the first bit set and the second bit set respectively comprise a positive integer number of bit(s).

In one embodiment, the first bit set and the second bit set respectively comprise at least one RLC Service Data Unit (SDU).

In one embodiment, the first bit set and the second bit set respectively comprise at least one PDCP SDU.

In one embodiment, RRC state of the first node in which the first message is received and the first message are related to a data volume comprised in the second bit set.

In one embodiment, when the first node is in the RRC_INACTIVE state when receiving the first message, and when the relay mode indicated by the first message is the L2 relay, the data volume comprised in the second bit set is greater than the data volume comprised in the first bit set.

In one embodiment, when the first node is in RRC_INACTIVE state when receiving the first message, and when the relay mode indicated by the first message is the L3 relay, the data volume comprised in the second bit set is not less than the data volume comprised in the first bit set.

In one embodiment, the second message is used to explicitly indicate the first target RRC state.

In one embodiment, the second message is used to implicitly indicate the first target RRC state.

In one embodiment, when the second message is either RRCResumeRequest or RRCResumeRequest1, it indicates that the first target RRC state is RRC_CONNECTED state.

In one embodiment, when the second message is either RRCResumeRequest or RRCResumeRequest1, it indicates that the first target RRC state is RRC_INACTIVE state.

In one embodiment, when the second message is RRCSetupRequest, it indicates that the first target RRC state is RRC_CONNECTED state.

In one embodiment, when the second message belongs to a PC5 signaling, it indicates that the first target RRC state is RRC_CONNECTED state.

In one embodiment, when the second message belongs to a PC5 signaling, it indicates that the first target RRC state is RRC_INACTIVE state.

In one embodiment, when the second message belongs to a Uu signaling, it indicates that the first target RRC state is RRC_CONNECTED state.

In one embodiment, when the second message belongs to a Uu signaling, it indicates that the first target RRC state is RRC_INACTIVE state.

In one embodiment, when the second message belongs to RRCResume_Relay or RRCSetup_Relay, it indicates that the first target RRC state is RRC_CONNECTED state.

In one embodiment, the behavior of generating the second bit set comprises generating at least one ADAPT (adaptive) PDU header, the second bit set comprises at least one ADAPT PDU header, and any ADAPT PDU header in the at least one ADAPT PDU header comprises a first identity; the first identity is used to indicate a bearer to which the first bit set belongs.

In one embodiment, the first identity comprises a bearer identity to which the first bit set belongs.

In one embodiment, the first identity comprises a destination reception node identity of the first bit set.

In one embodiment, the first identity comprises a bearer identity to which the first bit set belongs and a destination reception node identity of the first bit set.

Embodiment 2

Figure 2:
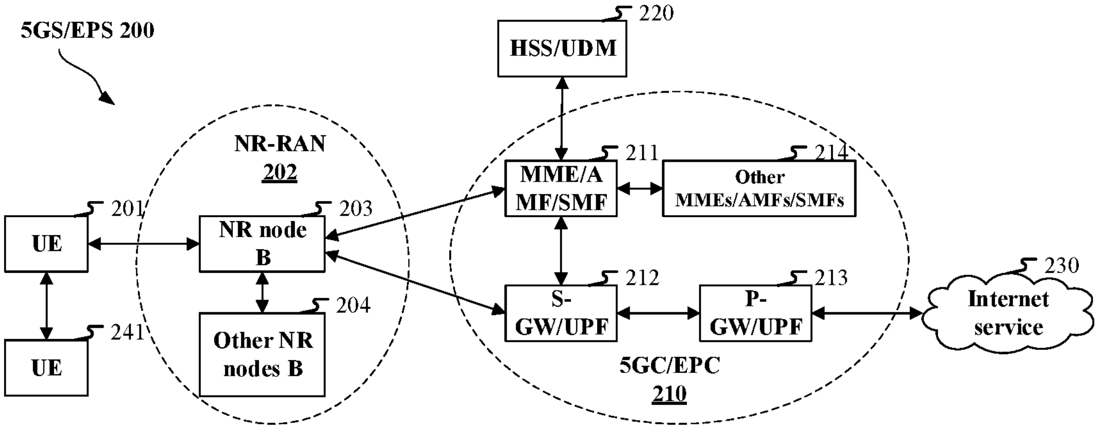
FIG. 2 illustrates a schematic diagram of a network architecture according to one embodiment of the present application.

Embodiment 2 illustrates a schematic diagram of a network architecture according to one embodiment of the present application, as shown in FIG. 2. FIG. 2 is a diagram illustrating a network architecture 200 of 5G NR, Long-Term Evolution (LTE), and Long-Term Evolution Advanced (LTE-A) systems. The NR 5G, LTE or LTE-A network architecture 200 may be called a 5G System (5GS)/Evolved Packet System (EPS) 200 or other appropriate terms. The 5GS/EPS 200 may comprise one or more UEs 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). XnAP protocol of Xn interface is used to transmit control plane messages of wireless networks, and user plane protocol of Xn interface is used to transmit user plane data. The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms, and in Non Terrestrial Networks (NTNs), the gNB 203 can be a satellite, an aircraft or a terrestrial base station relayed through a satellite. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, vehicle equipment, On-board communication unit, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 241 corresponds to the first node in the present application.

In one embodiment, the UE 201 corresponds to the second node in the present application.

In one embodiment, the gNB 203 corresponds to the third node in the present application.

In one embodiment, the gNB 203 is a Marco Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay differences.

In one embodiment, the gNB 203 is a flight platform.

In one embodiment, the gNB 203 is satellite.

In one embodiment, the gNB 203 is a base station that supports large delay differences.

In one embodiment, the gNB 203 is a test device (e.g., a transceiver device simulating part functions of a base station, a signaling tester).

In one embodiment, a radio link from the UE 201 to the gNB 203 is an uplink, and the uplink is used for executing an uplink transmission.

In one embodiment, a radio link from the gNB 203 to the UE 201 is a downlink, and the downlink is used for executing a downlink transmission.

In one embodiment, a radio link from the UE 241 to the gNB 203 is an uplink, and the uplink is used for executing an uplink transmission.

In one embodiment, a radio link from the gNB 203 to the UE 241 is a downlink, and the downlink is used for executing a downlink transmission.

In one embodiment, a radio link between the UE 201 and the UE 241 is a sidelink, and the sidelink is used for executing a sidelink transmission.

In one embodiment, the UE 201 and the gNB 203 are connected via a Uu air interface.

In one embodiment, the UE 241 and the gNB 203 are connected via a Uu air interface.

In one embodiment, the UE 201 and the UE 241 are connected via a PC5 air interface.

Embodiment 3

Figure 3:
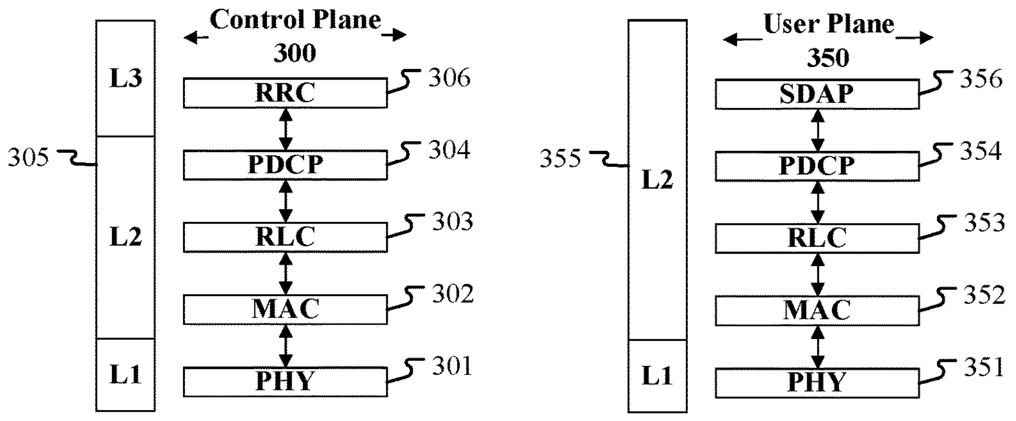
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for the control plane 300 of a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the UE and the gNB via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. The PDCP sublayer 304 provides data encryption and integrity protection and also provides support for a UE handover between gNBs. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel ID. The MAC sublayer 302 is also responsible for allocating between UEs various radio resources (i.e., resources block) in a cell. The MAC sublayer 302 is also responsible for Hybrid Automatic Repeat Request (HARQ) operation. The Radio Resource Control (RRC) sublayer 306 in layer 3 (L3) of the control plane 300 is responsible for acquiring radio resources (i.e., radio bearer) and configuring the lower layer with an RRC signaling between the gNB and the UE. Although not shown, the RRC sublayer 306 in the control plane 300 of the UE may also have a V2X layer, and the V2X layer is responsible for generating a PC5 QoS parameter group and QoS rules according to received service data or service requests, a PC5 QoS flow is generated corresponding to a PC5 QoS parameter group, and a PC5 QoS flow ID and the corresponding PC5 QoS parameter group are transmitted to an Access Stratum (AS) Layer for QoS processing of a packet belonging to the PC5 QoS flow ID by the AS layer; the V2X layer also comprises a PC5-Signaling Protocol sublayer, and the V2X layer is responsible for indicating whether each transmission of the AS layer is a PC5-S transmission or a V2X service data transmission. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. The radio protocol architecture of the UE in the user plane 350 may comprises part or all of protocol sublayers of the SDAP sublayer 356, the PDCP sublayer 354, the RLC sublayer 353 and the MAC sublayer 352 at L2 layer. Although not described in FIG. 3, the UE may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, an RLC channel comprises a Service Access Point (SAP) between the RLC 303 and the PDCP 304.

In one embodiment, an RLC channel comprises an SAP between the RLC 353 and the PDCP 354.

In one embodiment, a logical channel comprises an SAP between the RLC 303 and the MAC 302.

In one embodiment, a logical channel comprises an SAP between the RLC 353 and the MAC 352.

In one embodiment, a transport channel comprises an SAP between the MAC 302 and the PHY 301.

In one embodiment, a transport channel comprises an SAP between the MAC 352 and the PHY 351.

In one embodiment, entities of multiple sublayers of the control plane in FIG. 3 form a Signaling Radio Bear (SRB) in the vertical direction.

In one embodiment, entities of multiple sublayers of the user plane in FIG. 3 form a Data Radio Bear (DRB) in the vertical direction.

In one embodiment, the radio protocol architecture in FIG. 3 is applicable to the first node in the present application.

In one embodiment, the radio protocol architecture in FIG. 3 is applicable to the second node in the present application.

In one embodiment, the radio protocol architecture in FIG. 3 is applicable to the third node in the present application.

In one embodiment, the first message in the present application is generated by the RRC 306.

In one embodiment, the second message in the present application is generated by the RRC 306.

In one embodiment, the third message in the present application is generated by the RRC 306.

In one embodiment, the fourth message in the present application is generated by the RRC 306.

In one embodiment, the fifth message in the present application is generated by the RRC 306.

In one embodiment, the sixth message in the present application is generated by the RRC 306.

In one embodiment, the seventh message in the present application is generated by the RRC 306.

In one embodiment, the first bit group in the present application is generated by the MAC 302.

In one embodiment, the first bit group in the present application is generated by the MAC 352.

In one embodiment, the first bit group in the present application is generated by the RLC 303.

In one embodiment, the first bit group in the present application is generated by the RLC 353.

In one embodiment, the first bit group in the present application is generated by the PDCP 304.

In one embodiment, the first bit group in the present application is generated by the PDCP 354.

In one embodiment, the second bit group in the present application is generated by the MAC 302.

In one embodiment, the second bit group in the present application is generated by the MAC 352.

In one embodiment, the second bit group in the present application is generated by the RLC 303.

In one embodiment, the second bit group in the present application is generated by the RLC 353.

In one embodiment, the second bit group in the present application is generated by the PDCP 304.

In one embodiment, the second bit group in the present application is generated by the PDCP 354.

In one embodiment, the third bit group in the present application is generated by the MAC 302.

In one embodiment, the third bit group in the present application is generated by the MAC 352.

In one embodiment, the third bit group in the present application is generated by the RLC 303.

In one embodiment, the third bit group in the present application is generated by the RLC 353.

In one embodiment, the fourth bit group in the present application is generated by the MAC 302.

In one embodiment, the fourth bit group in the present application is generated by the MAC 352.

In one embodiment, the fourth bit group in the present application is generated by the RLC 303.

In one embodiment, the fourth bit group in the present application is generated by the RLC 353.

In one embodiment, the third bit set in the present application is generated by the PDCP 304.

In one embodiment, the third bit set in the present application is generated by the PDCP 354.

In one embodiment, the fourth bit set in the present application is generated by the PDCP 304.

In one embodiment, the fourth bit set in the present application is generated by the PDCP 354.

In one embodiment, the L2 layer 305 or 355 belongs to a higher layer.

In one embodiment, the RRC sublayer 306 in the L3 layer belongs to a higher layer.

Embodiment 4

Figure 4:
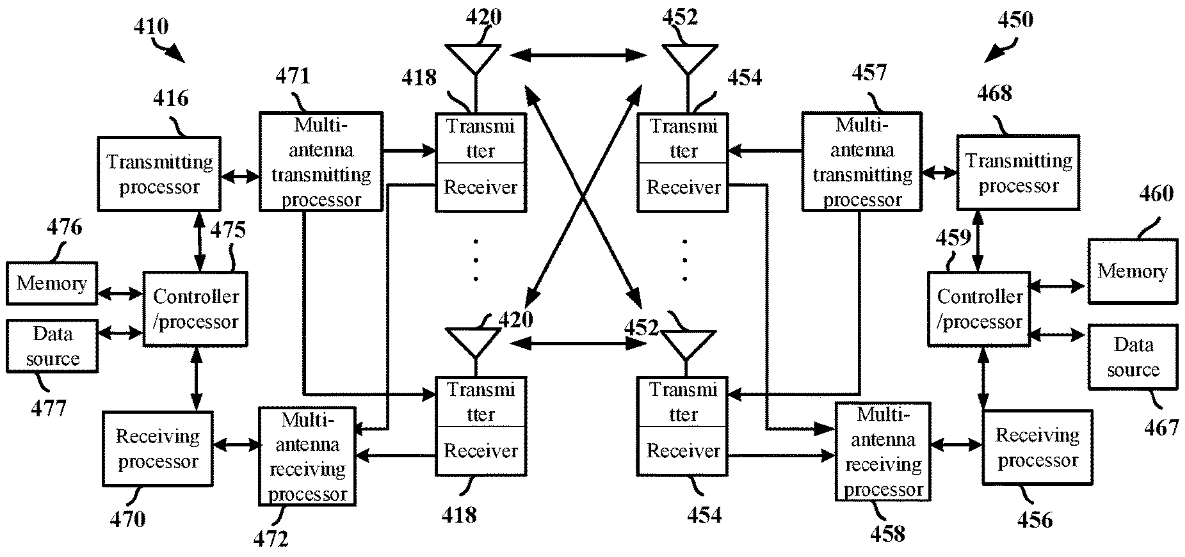
FIG. 4 illustrates a schematic diagram of hardware modules of a communication device according to one embodiment of the present application.

Embodiment 4 illustrates a schematic diagram of hardware modules of a communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a data source 477, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from the core network or a higher layer packet from the data source 477 is provided to the controller/processor 475. The core network and the data source 477 represents all protocol layers above the L2 layer. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers message modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In a transmission from the second communication device 410 to the first communication device 450, the controller/processor 459 provides multiplexing between a transport channel and a logical channel, packet reassembling, decryption, header decompression, control signal processing so as to recover a higher-layer packet from the second communication device 410. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the first communication device 450. The higher layer packet from the controller/processor 475 can be provided to all protocol layers above the core network or the L2 layer, and various control signals can also be provided to the core network or L3 layer for L3 layer processing.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first message through sidelink; determines a first transmission mode based on at least the first message; transmits a first bit group by adopting the first transmission mode, the first bit group comprises at least one bit; herein, the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied, the candidate transmission mode set comprises a candidate transmission mode of a transmission through sidelink.

In one embodiment, the first communication device 450 comprises: a memory that stores a computer readable instruction program. The computer readable instruction program generates an action when executed by at least one processor. The action includes: receiving a first message through sidelink; determining a first transmission mode based on at least the first message; transmitting a first bit group by adopting the first transmission mode, the first bit group comprising at least one bit; herein, the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied, the candidate transmission mode set comprises a candidate transmission mode of a transmission through sidelink.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first message through sidelink; transmits a third bit group through cellular link; receives a first bit group through sidelink, the first bit group comprises at least one bit; herein, at least the first message is used to determine a first transmission mode; the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied, the candidate transmission mode set comprises a candidate transmission mode of a transmission through sidelink; the third bit group comprises the first bit group.

In one embodiment, the second communication device 410 comprises a memory that stores a computer readable instruction program. The computer readable instruction program generates an action when executed by at least one processor. The action includes: transmitting a first message through sidelink; transmitting a third bit group through cellular link; receiving a first bit group through sidelink, the first bit group comprising at least one bit; herein, at least the first message is used to determine a first transmission mode; the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied, the candidate transmission mode set comprises a candidate transmission mode of a transmission through sidelink; the third bit group comprises the first bit group.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a sixth message through cellular link; receives a first bit group through cellular link, the first bit group comprises at least one bit; herein, the sixth message is used to generate third message; the third message is used to configure a third RLC bearer; the third message is used to indicate entering into RRC_INACTIVE state; the first bit group is received through the third RLC bearer; the third RLC bearer corresponds to a target bearer; the first bit group belongs to the target bearer.

In one embodiment, the second communication device 410 comprises a memory that stores a computer readable instruction program. The computer readable instruction program generates an action when executed by at least one processor. The action includes: transmitting a sixth message through cellular link; receiving a first bit group through cellular link, the first bit group comprising at least one bit; herein, the sixth message is used to generate third message; the third message is used to configure a third RLC bearer; the third message is used to indicate entering into RRC_INACTIVE state; the first bit group is received through the third RLC bearer; the third RLC bearer corresponds to a target bearer; the first bit group belongs to the target bearer.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first message through sidelink, and determines a first target RRC state based on at least the first message; receives a first bit set through sidelink; transmits a second message; generates a second bit set, transmits the second bit set through cellular link, and the second bit set comprises the first bit set; herein, the first target RRC state is one of RRC_INACTIVE state and RRC_CONNECTED state; the second message is used to indicate the first target RRC state.

In one embodiment, the first communication device 450 comprises: a memory that stores a computer readable instruction program. The computer readable instruction program generates an action when executed by at least one processor. The action includes: receiving a first message through sidelink, and determining a first target RRC state based on at least the first message; receiving a first bit set through sidelink; transmitting a second message; generating a second bit set, transmitting the second bit set through cellular link, and the second bit set comprising the first bit set; herein, the first target RRC state is one of RRC_INAC- TIVE state and RRC_CONNECTED state; the second message is used to indicate the first target RRC state.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first message through sidelink, at least the first message is used to determine a first target RRC state; transmits a first bit set through sidelink; herein, second message is transmitted; a second bit set is generated, and the second bit set is transmitted through cellular link, and the second bit set comprises the first bit set; the first target RRC state is one of RRC_INACTIVE state and RRC_CONNECTED state; the second message is used to indicate the first target RRC state.

In one embodiment, the second communication device 410 comprises a memory that stores a computer readable instruction program. The computer readable instruction program generates an action when executed by at least one processor. The action includes: transmitting a first message through sidelink, at least the first message being used to determine a first target RRC state; transmitting a first bit set through sidelink; herein, second message is transmitted; a second bit set is generated, and the second bit set is transmitted through cellular link, and the second bit set comprises the first bit set; the first target RRC state is one of RRC_INACTIVE state and RRC_CONNECTED state; the second message is used to indicate the first target RRC state.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first message through sidelink; receives a sixth message through cellular link; receives a first bit set through sidelink; transmits seventh message through sidelink; transmits a second message; generates a second bit set, transmits the second bit set through cellular link, and the second bit set comprises the first bit set; herein, the sixth message is used to generate the seventh message; the seventh message is used to generate the first message; the second message is used to indicate a first target RRC state, and the first target RRC state is one of RRC_INACTIVE state and RRC_CONNECTED state;

In one embodiment, the first communication device 450 comprises: a memory that stores a computer readable instruction program. The computer readable instruction program generates an action when executed by at least one processor. The action includes: receiving a first message through sidelink; receiving a sixth message through cellular link; receiving a first bit set through sidelink; transmitting a seventh message through sidelink; transmitting a second message; generating a second bit set, transmitting the second bit set through cellular link, and the second bit set comprising the first bit set; herein, the sixth message is used to generate the seventh message; the seventh message is used to generate the first message; the second message is used to indicate a first target RRC state, and the first target RRC state is one of RRC_INACTIVE state and RRC_CONNECTED state.

In one embodiment, the second communication device 410 comprises at least one processor and at least one memory. The at least one memory comprises computer program codes; the at least one memory and the computer program codes are configured to be used in collaboration with the at least one processor. The second communication device 410 at least: transmits a first message through sidelink; transmits a first bit set through sidelink; receives a seventh message through sidelink; herein, sixth message is received through cellular link; the sixth message is used to generate the seventh message; the seventh message is used to generate the first message; second message is transmitted; a second bit set is generated, and the second bit set is transmitted through cellular link, and the second bit set comprises the first bit set; the second message is used to indicate a first target RRC state, and the first target RRC state is one of RRC_INACTIVE state and RRC_CONNECTED state.

In one embodiment, the second communication device 410 comprises a memory that stores a computer readable instruction program. The computer readable instruction program generates an action when executed by at least one processor. The action includes: transmitting a first message through sidelink; transmitting a first bit set through sidelink; receiving a seventh message through sidelink; herein, sixth message is received through cellular link; the sixth message is used to generate the seventh message; the seventh message is used to generate the first message; second message is transmitted; a second bit set is generated, and the second bit set is transmitted through cellular link, and the second bit set comprises the first bit set; the second message is used to indicate a first target RRC state, and the first target RRC state is one of RRC_INACTIVE state and RRC_CONNECTED state.

In one embodiment, the first communication device 450 corresponds to a first node in the present application, and the second communication device 410 corresponds to a second node in the present application.

In one embodiment, the first communication device 450 corresponds to a first node in the present application, and the second communication device 410 corresponds to a third node in the present application.

In one embodiment, the first communication device 450 corresponds to a second node in the present application, and the second communication device 410 corresponds to a third node in the present application.

In one embodiment, the first communication device 450 is a relay node.

In one embodiment, the first communication device 450 is a UE.

In one embodiment, the first communication 450 is a Road Side Unit (RSU).

In one embodiment, the second communication device 410 is a relay node.

In one embodiment, the second communication device 410 is a base station.

In one embodiment, the second communication device 410 is an RSU.

In one embodiment, the second communication device 410 is a UE.

In one embodiment, the third communication device 410 is a base station.

In one embodiment, at least one of the antenna 452, the receiver 454, the multi-antenna receiving processor 458, the receiving processor 456 or the controller/processor 459 is used to receive a first message in the present application.

In one embodiment, at least one of the antenna 420, the transmitter 418, the multi-antenna transmitting processor 471, the transmitting processor 416 or the controller/processor 475 is used to transmit a first message in the present application.

In one embodiment, at least one of the antenna 452, the transmitter 454, the multi-antenna transmitting processor 457, the transmitting processor 468 or the controller/processor 459 is used to transmit a first bit group in the present application.

In one embodiment, at least one of the antenna 420, the receiver 418, the multi-antenna receiving processor 472, the receiving processor 470 or the controller/processor 475 is used to receive a first bit group in the present application.

In one embodiment, at least one of the antenna 452, the receiver 454, the multi-antenna receiving processor 458, the receiving processor 456 or the controller/processor 459 is used to receive a third message in the present application.

In one embodiment, at least one of the antenna 420, the transmitter 418, the multi-antenna transmitting processor 471, the transmitting processor 416 or the controller/processor 475 is used to transmit a third message in the present application.

In one embodiment, at least one of the antenna 452, the transmitter 454, the multi-antenna transmitting processor 457, the transmitting processor 468 or the controller/processor 459 is used to transmit a second bit group in the present application.

In one embodiment, at least one of the antenna 420, the receiver 418, the multi-antenna receiving processor 472, the receiving processor 470 or the controller/processor 475 is used to receive a second bit group in the present application.

In one embodiment, at least one of the antenna 452, the receiver 454, the multi-antenna receiving processor 458, the receiving processor 456 or the controller/processor 459 is used to receive a second message in the present application.

In one embodiment, at least one of the antenna 420, the transmitter 418, the multi-antenna transmitting processor 471, the transmitting processor 416 or the controller/processor 475 is used to transmit a second message in the present application.

In one embodiment, at least one of the antenna 452, the receiver 454, the multi-antenna receiving processor 458, the receiving processor 456 or the controller/processor 459 is used to receive a fifth message in the present application.

In one embodiment, at least one of the antenna 420, the transmitter 418, the multi-antenna transmitting processor 471, the transmitting processor 416 or the controller/processor 475 is used to transmit a fifth message in the present application.

In one embodiment, at least one of the antenna 452, the transmitter 454, the multi-antenna transmitting processor 457, the transmitting processor 468 or the controller/processor 459 is used to transmit a fourth bit group in the present application.

In one embodiment, at least one of the antenna 420, the receiver 418, the multi-antenna receiving processor 472, the receiving processor 470 or the controller/processor 475 is used to receive a fourth bit group in the present application.

In one embodiment, at least one of the antenna 452, the receiver 454, the multi-antenna receiving processor 458, the receiving processor 456 or the controller/processor 459 is used to receive a sixth message in the present application.

In one embodiment, at least one of the antenna 420, the transmitter 418, the multi-antenna transmitting processor 471, the transmitting processor 416 or the controller/processor 475 is used to transmit a sixth message in the present application.

In one embodiment, at least one of the antenna 452, the receiver 454, the multi-antenna receiving processor 458, the receiving processor 456 or the controller/processor 459 is used to receive a fourth message in the present application.

In one embodiment, at least one of the antenna 420, the transmitter 418, the multi-antenna transmitting processor 471, the transmitting processor 416 or the controller/processor 475 is used to transmit a fourth message in the present application.

In one embodiment, at least one of the antenna 452, the transmitter 454, the multi-antenna transmitting processor 457, the transmitting processor 468 or the controller/processor 459 is used to transmit a third bit group in the present application.

In one embodiment, at least one of the antenna 420, the receiver 418, the multi-antenna receiving processor 472, the receiving processor 470 or the controller/processor 475 is used to receive a third bit group in the present application.

In one embodiment, at least one of the antenna 452, the receiver 454, the multi-antenna receiving processor 458, the receiving processor 456 or the controller/processor 459 is used to receive a first bit set in the present application.

In one embodiment, at least one of the antenna 420, the transmitter 418, the multi-antenna transmitting processor 471, the transmitting processor 416 or the controller/processor 475 is used to transmit a first bit set in the present application.

In one embodiment, at least one of the antenna 452, the transmitter 454, the multi-antenna transmitting processor 457, the transmitting processor 468 or the controller/processor 459 is used to transmit a second message in the present application.

In one embodiment, at least one of the antenna 420, the receiver 418, the multi-antenna receiving processor 472, the receiving processor 470 or the controller/processor 475 is used to receive a second message in the present application.

In one embodiment, at least one of the antenna 452, the transmitter 454, the multi-antenna transmitting processor 457, the transmitting processor 468 or the controller/processor 459 is used to transmit a second bit set in the present application.

In one embodiment, at least one of the antenna 452, the transmitter 454, the multi-antenna transmitting processor 457, the transmitting processor 468 or the controller/processor 459 is used to transmit a third message in the present application.

In one embodiment, at least one of the antenna 420, the receiver 418, the multi-antenna receiving processor 472, the receiving processor 470 or the controller/processor 475 is used to receive a third message in the present application.

In one embodiment, at least one of the antenna 452, the transmitter 454, the multi-antenna transmitting processor 457, the transmitting processor 468 or the controller/processor 459 is used to transmit a fourth message in the present application.

In one embodiment, at least one of the antenna 452, the receiver 454, the multi-antenna receiving processor 458, the receiving processor 456 or the controller/processor 459 is used to receive a third bit set in the present application.

In one embodiment, at least one of the antenna 420, the transmitter 418, the multi-antenna transmitting processor 471, the transmitting processor 416 or the controller/processor 475 is used to transmit a third bit set in the present application.

In one embodiment, at least one of the antenna 452, the transmitter 454, the multi-antenna transmitting processor 457, the transmitting processor 468 or the controller/processor 459 is used to transmit a fourth bit set in the present application.

In one embodiment, at least one of the antenna 452, the transmitter 454, the multi-antenna transmitting processor 457, the transmitting processor 468 or the controller/processor 459 is used to transmit a seventh message in the present application.

In one embodiment, at least one of the antenna 420, the receiver 418, the multi-antenna receiving processor 472, the receiving processor 470 or the controller/processor 475 is used to receive a seventh message in the present application.

Embodiment 5A

Figure 5A:
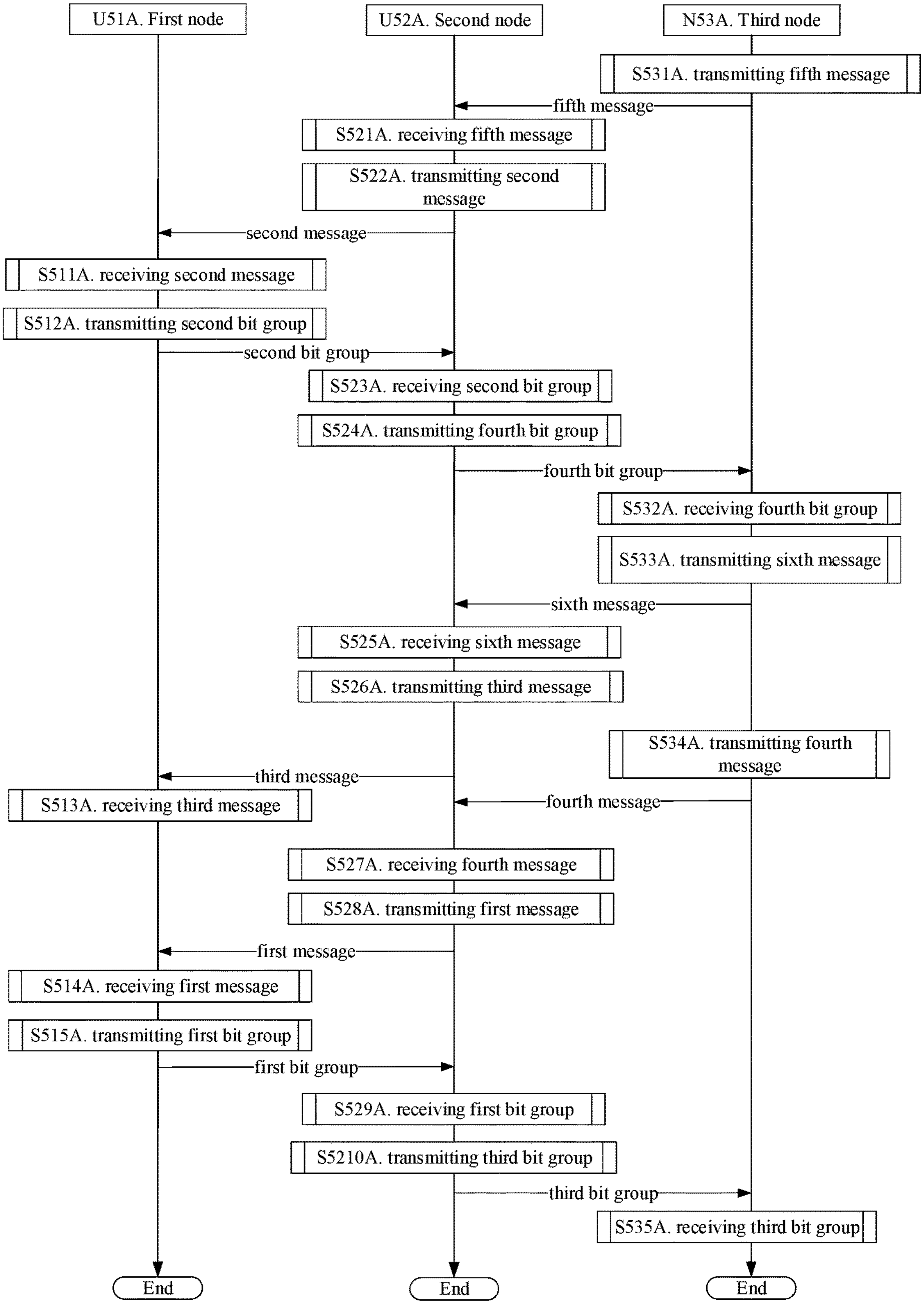
FIG. 5A illustrates a flowchart of radio signal transmission according to one embodiment of the present application.

Embodiment 5A illustrates a flowchart of radio signal transmission according to one embodiment in the present application, as shown in FIG. 5A. In FIG. 5A, a first node U51A and a second node U52A are in communications via a PC5 air interface; a second node U52A and a third node N53A are in communications via a Uu air interface.

The first node U51A receives a second message in step S511A; transmits a second bit group in step S512A; receives a third message in step S513A; receives a first message in step S514A; in step S515A, transmits the first bit group through sidelink.

The second node U52A receives a fifth message in step S521A; transmits a second message in step S522A; receives a second bit group in step S523A; transmits a fourth bit group in step S524A; receives a sixth message in step S525A; transmits a third message in step S526A; receives a fourth message in step S527A; transmits a first message in step S528A; receives a first bit group through sidelink in step S529A; transmits a third bit group through cellular link in step S5210A.

The third node N53A transmits a fifth message in step S531A; receives a fourth bit group in step S532A; transmits a sixth message in step S533A; transmits a fourth message in step S534A; receives a third bit group through cellular link in step S535A.

In one embodiment, the second node is the transmitter of the first message.

In one embodiment, a serving base station of the first node is the same as a serving base station of the second node.

In one embodiment, the serving base station of the first node is different from the serving base station of the second node.

In one embodiment, the first message comprises RRC_CONNECTED state.

In one embodiment, the first message comprises a candidate transmission mode transmitted through sidelink.

In one embodiment, the first condition set comprising that the first message comprises RRC_CONNECTED state.

In one embodiment, the first condition set comprises that the first information comprises RRC_CONNECTED state, and the first message indicates a candidate transmission mode transmitted through sidelink.

In one embodiment, the first message comprises a first threshold.

In one embodiment, the first threshold is represented in byte.

In one embodiment, the first threshold is a fixed value.

In one embodiment, the first threshold is a variable value.

In one embodiment, a value of the first threshold is determined by the second node.

In one embodiment, a value of the first threshold is not greater than a value of the second threshold.

In one embodiment, a value of the first threshold is less than a value of the second threshold.

In one embodiment, a value of the first threshold is a difference of a value of the second threshold minus a first offset value.

In one embodiment, the first offset value is a size of an ADAPT sub-header.

In one embodiment, the first offset value is a size reserved for a MAC SDU belonging to an RLC bearer other than the first RLC bearer in the fourth RLC carrier set.

In one embodiment, the first message comprises a first threshold; the first condition set comprises that the data volume of the first bit set is not less than a first threshold.

In one embodiment, the first message comprises a first threshold; the first condition set comprises that the data volume the first bit set is greater than the first threshold.

In one embodiment, the first message comprises a first threshold; the first condition set comprises that the data volume of the first bit set is not less than the first threshold, and comprises that the first message indicates a candidate transmission mode transmitted through sidelink.

In one embodiment, the first message comprises a first threshold; the first condition set comprises that the data volume of the first bit set is greater than the first threshold, and comprises that the first message indicates a candidate transmission mode transmitted through sidelink.

In one embodiment, when the first message comprises the RRC_CONNECTED state, it is determined that the first transmission mode is a transmission through sidelink.

In one embodiment, when the first message comprises the RRC_CONNECTED state, and when the data volume of the first bit set is not less than the second threshold, it is determined that the first transmission mode is a transmission through sidelink.

In one embodiment, when the first message comprises the RRC_CONNECTED state, and when the data volume of the first bit set is greater than the second threshold, it is determined that the first transmission mode is a transmission through sidelink.

In one embodiment, when the first message comprises the RRC_CONNECTED state, and when the data volume of the first bit set is less than the second threshold, it is determined that the first transmission mode is a transmission through cellular link.

In one embodiment, when the first message comprises the first threshold, and when the data volume of the first bit set is not less than the first threshold, it is determined that the first transmission mode is a transmission through sidelink.

In one embodiment, when the first message comprises the first threshold, and when the data volume of the first bit set is greater than the first threshold, it is determined that the first transmission mode is a transmission through sidelink.

In one embodiment, when the first message comprises the first threshold, and when the data volume of the first bit set is less than the first threshold, it is determined that the first transmission mode is a transmission through cellular link.

In one embodiment, when the first message comprises the RRC_CONNECTED state, and when the cellular link channel state is worse than the sidelink channel state, it is determined that the first transmission mode is a transmission through sidelink.

In one embodiment, when the first message comprises the RRC_CONNECTED state, and when the cellular link channel state is worse than a first reference value and the sidelink channel state is better than a second reference value, it is determined that the first transmission mode is a transmission through sidelink.

In one embodiment, when the first message comprises the first threshold, and when the data volume of the first bit set is not less than the first threshold, and the cellular link channel state is worse than the sidelink channel state, it is determined that the first transmission mode is a transmission through sidelink.

In one embodiment, when the first message comprises the first threshold, and when the data volume of the first bit set is greater than the first threshold, and the cellular link channel state is worse than the sidelink channel state, it is determined that the first transmission mode is a transmission through sidelink.

In one embodiment, when the first message comprises the first threshold, and the data volume in the first bit set is less than the first threshold, and the sidelink channel state is different from the cellular link channel state, it is determined that the first transmission mode is a transmission through the cellular link.

In one embodiment, when the first message comprises the RRC_CONNECTED state, and when the data volume of the first bit set is not less than the second threshold, and the cellular link channel state is worse than the sidelink channel state, it is determined that the first transmission mode is a transmission through sidelink.

In one embodiment, the phrase that the cellular link channel state is less than the sidelink channel state comprises: an RSRP value of the cellular link is less than an RSRP value of the sidelink.

In one embodiment, the phrase that the sidelink channel state is less than the cellular link channel state comprises: an RSRP value of the sidelink is less than an RSRP value of the cellular link.

In one embodiment, the first reference value and the second reference value are respectively configured by the network.

In one embodiment, the first reference value and the second reference value are respectively pre-configured.

In one embodiment, the first bit set comprises the first bit group.

In one embodiment, all bits comprised in the first bit set belong to the first bit group.

In one embodiment, at least one bit comprised in the first bit set does not belong to the first bit group.

In one embodiment, the first bit set is transmitted by the first transmission mode.

In one embodiment, a bit in the first bit set other than the first bit group is transmitted in a transmission mode other than the first transmission mode.

In one embodiment, the first bit set comprises all currently cached bits.

In one embodiment, the first bit set comprises all currently cached bits at the MAC sublayer.

In one embodiment, the first bit set comprises all currently cached bits at the MAC sublayer and the RLC sublayer.

In one embodiment, the first bit set comprises all currently cached bits at the MAC sublayer, the RLC sublayer and the PDCP sublayer.

In one embodiment, when the first transmission mode is the transmission through sidelink, the first bit group is transmitted through a first RLC bearer.

In one embodiment, the first RLC bearer is identified by a first logical channel identity (LCID).

In one embodiment, when the first transmission mode is the transmission through sidelink, the first bit group being transmitted through a first RLC bearer comprises: the first bit group comprises the first LCID.

In one embodiment, when the first transmission mode is the transmission through sidelink, the first bit group being transmitted through a first RLC bearer comprises: the first RLC bearer is activated before the first bit group is transmitted through the first RLC bearer.

In one embodiment, the first RLC bearer is used for sidelink transmission between the first node and the transmitter of the first message.

In one embodiment, when the first transmission mode is the transmission through cellular link, the first bit group is transmitted through a third RLC bearer.

In one embodiment, the first RLC bearer and the third RLC bearer respectively correspond to a target bearer.

In one embodiment, the first RLC bearer corresponds to the target bearer.

In one embodiment, the third RLC bearer corresponds to the target bearer.

In one embodiment, the phrase that the first RLC bearer correspond to the target bearer comprises: configuration message of the first RLC bearer comprises identifying the target bearer identity of the target bearer; the target bearer is a radio bearer served by the first RLC bearer.

In one embodiment, the phrase that the first RLC bearer correspond to the target bearer comprises: the first RLC bearer is a lower layer part of the target bearer.

In one embodiment, the lower layer part comprises at least a former of the RLC sublayer or MAC sublayer.

In one embodiment, the phrase that the third RLC bearer correspond to the target bearer comprises: configuration message of the third RLC bearer comprises identifying a target bearer identity of the target bearer; the target bearer is a radio bearer served by the third RLC bearer.

In one embodiment, the phrase that the third RLC bearer correspond to the target bearer comprises: the third RLC bearer is a lower layer part of the target bearer.

In one embodiment, the target bearer is a data radio bearer (DRB).

In one embodiment, the target bearer is a signaling radio bearer (SRB).

In one embodiment, the signaling radio bearer is SRB0.

In one embodiment, the signaling radio bearer is SRB1.

In one embodiment, the signaling radio bearer is SRB2.

In one embodiment, the signaling radio bearer is SRB3.

In one embodiment, the target bearer belongs to an Evolved Packet Switched System (EPS) bearer.

In one embodiment, the target bearer belongs to the E-UTRAN radio access bearer (E-RAB) bearer.

In one embodiment, the first bit group belongs to the target bearer.

In one embodiment, the first bit group belonging to the target bearer comprises: the first bit group is transmitted through the target bearer.

In one embodiment, the first bit set belongs to the target bearer.

In one embodiment, at least one bit comprised in the first bit set does not belong to the target bearer.

In one embodiment, the third node transmits a fifth message to the second node through cellular link.

In one embodiment, the fifth message comprises at least one RRC message.

In one embodiment, the fifth message comprises a first RRC message and a second RRC message, and the first RRC message and the second RRC message belong to different MAC PDUs.

In one embodiment, the first RRC message and the second RRC message respectively comprise all or partial IEs in an RRC message.

In one embodiment, the first RRC message and the second RRC message respectively comprise all or partial fields in an IE in an RRC message.

In one embodiment, the first RRC message and the second RRC message respectively comprise RRCReconfiguration.

In one embodiment, the first RRC message comprises RRCSetup, and the second RRC message comprises RRCReconfiguration.

In one embodiment, the fifth message comprises an RLC-BearerConfig field.

In one embodiment, the fifth message is used to generate the second message.

In one embodiment, at least one RRC message comprised in the fifth message is used to generate a second message.

In one embodiment, the first RRC message comprised in the fifth message is used to generate the second message.

In one embodiment, a target receiver of the first RRC message comprised in the fifth message is the first node.

In one embodiment, the phrase that the fifth message is used to generate the second message comprises: the fifth message comprises the second message.

In one embodiment, the phrase that the fifth message is used to generate the second message comprises: the first RRC message comprised in the fifth message is used to generate the second message.

In one embodiment, the second node transmits the second message through sidelink.

In one embodiment, the second message comprises an RRC message.

In one embodiment, the second message comprises all or partial IEs in RRC message.

In one embodiment, the second message comprises all or partial fields in an IE in an RRC message.

In one embodiment, a name of the second message comprises relay.

In one embodiment, the second message comprises RRC-Setup.

In one embodiment, the second message comprises RRCReconfiguration.

In one embodiment, the second message comprises an RLC-BearerConfig field.

In one embodiment, the second message comprises an RLC configuration of the first RLC bearer and a logical channel configuration of the first RLC bearer.

In one embodiment, the RLC configuration at least comprises RLC working mode.

In one embodiment, the logical channel configuration at least comprises priority.

In one embodiment, the second message comprises the first logical channel identity and the target bearer identity.

In one embodiment, the target bearer identity is a drb-Identity.

In one embodiment, the target bearer identity is an srb-Identity.

In one embodiment, the target bearer identity is an eps-BearerIdentity.

In one embodiment, the phrase that the second message configures the first RLC bearer comprises: the second message is used by the first node to configure the first RLC bearer.

In one embodiment, the phrase that the second message configures the first RLC bearer comprises: an RLC entity of the first RLC bearer is established at the first node.

In one embodiment, the fifth message configures the first RLC bearer and the second RLC bearer.

In one embodiment, the phrase that the fifth message configures a first RLC bearer and the second RLC bearer comprises: the second RRC message comprised in the fifth message configures the first RLC bearer and the second RLC bearer.

In one embodiment, the second RRC message comprises an RRC message.

In one embodiment, the second RRC message comprises all or partial IEs in an RRC message.

In one embodiment, the second RRC message comprises all or partial fields of an IE in an RRC message.

In one embodiment, the second RRC message comprises an RRCReconfiguration.

In one embodiment, the phrase that the fifth message configures the first RLC bearer and the second RLC bearer comprises: the fifth message comprises an RLC configuration of the first RLC bearer and a logical channel configuration of the first RLC bearer, as well as comprises an RLC configuration of the second RLC bearer and a logical channel configuration of the second RLC bearer.

In one embodiment, the second RRC message comprised in the fifth message comprises the first logical channel identity, a second logical channel identity and the target bearer identity.

In one embodiment, the second RLC bearer is identified by the second logical channel identity.

In one embodiment, a target receiver of the second RRC message comprised in the fifth message is the second node.

In one embodiment, the phrase that the fifth message is used to configure a first RLC bearer and the second RLC bearer comprises: the fifth message is used by the second node to configure the first RLC bearer and the second RLC bearer.

In one embodiment, the phrase that the fifth message is used to configure a first RLC bearer and the second RLC bearer comprises: an RLC entity of the first RLC bearer and an RLC entity of the second RLC bearer are respectively established at the second node.

In one embodiment, the phrase that the second RLC bearer correspond to the target bearer comprises: configuration message of the second RLC bearer comprises identifying a target carrier identity of the target bearer; the target bearer is a radio bearer served by the second RLC bearer.

In one embodiment, the phrase that the second RLC bearer corresponds to the target bearer comprises: the second RLC bearer is a lower layer part of the target bearer.

In one embodiment, the second message is received before the first node transmitting the second bit group.

In one embodiment, the third node transmits the second message through cellular link.

In one embodiment, the first node receives the second message through downlink.

In one embodiment, the first node transmits the second bit group through sidelink before receiving the first message.

In one embodiment, the first node is in RRC_CONNECTED state when transmitting the second bit group.

In one embodiment, the second bit group comprises at least one bit.

In one embodiment, the second bit group comprises at least one byte.

In one embodiment, the second bit group comprises a positive integer number of bit(s).

In one embodiment, the second bit group comprises at least one RLC SDU.

In one embodiment, the second bit group comprises at least one PDCP SDU.

In one embodiment, the second bit group comprises at least one MAC SDU.

In one embodiment, the second bit group comprises at least one MAC PDU.

In one embodiment, a target receiver of the second bit group is a network device.

In one embodiment, the target receiver of the second bit group is the third node.

In one embodiment, the fourth bit group comprises the second bit group.

In one embodiment, the second bit group is used to generate the fourth bit group.

In one embodiment, the fourth bit group comprises at least one RLC SDU.

In one embodiment, the fourth bit group comprises at least one MAC PDU.

In one embodiment, the second node transmits the fourth bit group through cellular link after receiving the fifth message and before receiving the sixth message.

In one embodiment, the third node receives the fourth bit group after transmitting the fifth message and before transmitting the sixth message.

In one embodiment, a transmission of the fifth message is earlier than a transmission of the sixth message.

In one embodiment, the third node transmits a sixth message through cellular link.

In one embodiment, the sixth message comprises an RRC message.

In one embodiment, the sixth message comprises all or partial IEs in an RRC message.

In one embodiment, the sixth message comprises all or partial fields in an IE in an RRC message.

In one embodiment, the sixth message comprises an RRCRelease.

In one embodiment, the sixth message comprises an RRCReleaseIE.

In one embodiment, the sixth message is used to generate the third message.

In one embodiment, the sixth message comprises an RRCReleaseIE and an rlc-BearerToAddModList field.

In one embodiment, the sixth message comprises an RRCReleaseIE and an RLC-BearerConfig field.

In one embodiment, the third message only comprises one RRC message.

In one embodiment, the third message is an RRC message.

In one embodiment, the third message comprises all or partial IEs in RRC message.

In one embodiment, the third message comprises all or partial fields in an IE in RRC message.

In one embodiment, the third message comprises an RRCRelease.

In one embodiment, the third message comprises an RRCReleaseIE.

In one embodiment, an RRC message comprised in the third message comprises an RRCReleaseIE and an rlc-BearerToAddModList field.

In one embodiment, an RRC message comprised in the third message comprises an RRCReleaseIE and an RLC-BearerConfig field.

In one embodiment, before transmitting the first message and after receiving the second bit group, the third message is transmitted through sidelink.

In one embodiment, the third message is used to configure the third RLC bearer of the first node.

In one embodiment, the phrase that the third message is used to configure the third RLC bearer comprises: the third message comprises an RLC configuration of the third RLC bearer and a logical channel configuration of the third RLC bearer.

In one embodiment, the third message comprises a third logical channel identity and the target bearer identity.

In one embodiment, the phrase that the third message is used to configure the third RLC bearer comprises: the third message is used by the first node to configure the third RLC bearer.

In one embodiment, the phrase that the third message is used to configure the third RLC bearer comprises: the first node maintains RLC configuration parameters of the third RLC bearer.

In one embodiment, the phrase that the third message is used to configure the third RLC bearer comprises: an RLC entity of the third RLC bearer is not established at the first node.

In one embodiment, the third message is used to indicate that the first node enters into RRC_INACTIVE state.

In one embodiment, the third message comprises a suspendConfig field; the suspendConfig field indicates a suspended UE context of the first node in RRC_INACTIVE state.

In one embodiment, the third message comprises a suspendConfig field; the suspendConfig field indicates at least one of a fullI-RNTI and a shortI-RNTI.

In one embodiment, the third message being used to indicate that the first node enters into the RRC_INACTIVE state comprises: the first node resets a MAC and releases a MAC cell group configuration.

In one embodiment, the third message being used to indicate that the first node enters into the RRC_INACTIVE state comprises: suspending the first RLC bearer.

In one embodiment, the third message being used to indicate that the first node enters into the RRC_INACTIVE state comprises: suspending all signaling radio bearers and data radio bearers other than SRB0.

In one embodiment, the third message being used to indicate that the first node enters into the RRC_INACTIVE state comprises: indicating suspending a PDCP to lower layers of all data radio bearers.

In one embodiment, the third message being used to indicate that the first node enters into the RRC_INACTIVE state comprises: indicating suspending an RRCconnection to upper layer.

In one embodiment, the lower layer comprises at least one of the RLC sublayer, the MAC sublayer, or the PHY layer.

In one embodiment, the phrase that the third message is used to indicate that the first node enters into the RRC_INACTIVE state comprises: indicating that the target bearer executing a small data transmission when the first node is in RRC_INACTIVE state is allowable.

In one embodiment, the phrase that the third message is used to indicate that the first node enters into the RRC_INACTIVE state comprises: indicating that the first RLC bearer executing a small data transmission when the first node is in RRC_INACTIVE state is allowable.

In one embodiment, the phrase that the third message is used to indicate that the first node enters into the RRC_INACTIVE state comprises: indicating establishing the third RLC bearer and indicating that the third RLC bearer executing a small data transmission when the first node is in the RRC_INACTIVE state is allowable.

In one embodiment, the phrase that the third message is used to indicate that the first node enters into the RRC_INACTIVE state comprises: indicating that the target bearer transmitting through cellular link when the first node is in RRC_INACTIVE state is allowable.

In one embodiment, the phrase that the third message is used to indicate that the first node enters into the RRC_INACTIVE state comprises: indicating establishing the third RLC bearer and indicating a transmission of the third RLC bearer through cellular link when the first node is in the RRC_INACTIVE state is allowable.

In one embodiment, a fourth message is transmitted through cellular link; the fourth message is transmitted after the sixth message.

In one embodiment, a time interval between a transmission time of the fourth message and a transmission time of the sixth message is not less than a first threshold.

In one embodiment, the first threshold is 6 milliseconds.

In one embodiment, the first threshold is 10 milliseconds.

In one embodiment, the first threshold is 16 milliseconds.

In one embodiment, the second node receives the fourth message after transmitting the third message.

In one embodiment, after the second node transmitting the third message, the third node transmits the fourth message.

In one embodiment, the fourth message comprises an RRC message.

In one embodiment, the fourth message comprises all or partial IEs in RRC message.

In one embodiment, the fourth message comprises all or partial fields in an IE in an RRC message.

In one embodiment, the fourth message comprises an RRCReconfiguration.

In one embodiment, the fourth message comprises an RRCRelease.

In one embodiment, the fourth message comprises an RLC-ToSuspend field.

In one embodiment, the fourth message comprises the first logical channel identity.

In one embodiment, the fourth message is used to indicate that the first RLC bearer is suspended.

In one embodiment, the phrase that an RLC bearer is suspended comprises: an RLC entity of the RLC bearer is released.

In one embodiment, the fourth message is used to indicate that the second RLC bearer is suspended.

In one embodiment, the fourth message is used to implicitly indicate that the second RLC bearer is suspended.

In one embodiment, the first RLC bearer belongs to the fourth RLC bearer set; the fourth RLC bearer set comprises at least one RLC bearer.

In one embodiment, the fourth RLC bear set is mapped to the second RLC bearer.

In one embodiment, any RLC bearer in the fourth RLC bear set is mapped to the second RLC bearer.

In one embodiment, any RLC bearer in the fourth RLC bear set is an ingress RLC bearer.

In one embodiment, the second RLC bearer is an egress RLC bearer.

In one embodiment, the first RLC bearer and the second RLC bearer are used by the second node for a relay transmission of the target bearer.

In one embodiment, all RLC bearers in the fourth RLC bearer set are suspended.

In one embodiment, the phrase that all RLC bearers in the fourth RLC bearer set are suspended comprises: all RLC entities corresponding to all RLC bearers in the fourth RLC bearer set are released; any RLC carrier in the fourth RLC bearer set corresponds to one RLC entity.

In one embodiment, the phrase that the fourth message is used to implicitly indicate that the second RLC bearer is suspended comprises: the fourth message indicates that the first RLC bearer is suspended; the first RLC bearer belongs to the fourth RLC bearer set; the fourth RLC bearing set is mapped to the second RLC bearer; when all RLC bearers in the fourth RLC bearer set are suspended, the second RLC bearer is suspended.

In one embodiment, the second node transmits the first message through sidelink.

In one embodiment, the first node adopts a candidate transmission mode transmitted through sidelink to transmit the first bit group; the second node receives the first bit group through sidelink.

In one embodiment, the phrase of receiving a first bit group through sidelink comprises: the second node receives the first bit group, determines that the first bit group belongs to the first RLC bearer and activates the first RLC bearer based on the first logical channel identity comprised in the first bit group.

In one embodiment, the phrase of activating an RLC bearer comprises establishing an RLC entity based on a configuration of the RLC bearer.

In one embodiment, the second node transmits a third bit group through cellular link.

In one embodiment, the third bit group is transmitted through the second RLC bearer.

In one embodiment, the phrase of transmitting the third bit group through the second RLC bearer comprises: activating the second RLC bearer before transmitting the third bit group.

In one embodiment, the second RLC bearer is used for a cellular link transmission between the second node and a serving base station of the second node.

In one embodiment, the third bit group comprises the second logical channel identity.

In one embodiment, the third bit group comprises at least one RLC SDU.

In one embodiment, the third bit group comprises at least one MAC PDU.

In one embodiment, the third bit group comprises the first bit group.

In one embodiment, the first bit group is used to generate the third bit group.

In one embodiment, a target receiver of the first bit group is a network device.

In one embodiment, the target receiver of the first bit group is the third node.

In one embodiment, the first node is in RRC_INACTIVE state when transmitting the first bit group.

Embodiment 5B

Figure 5B:
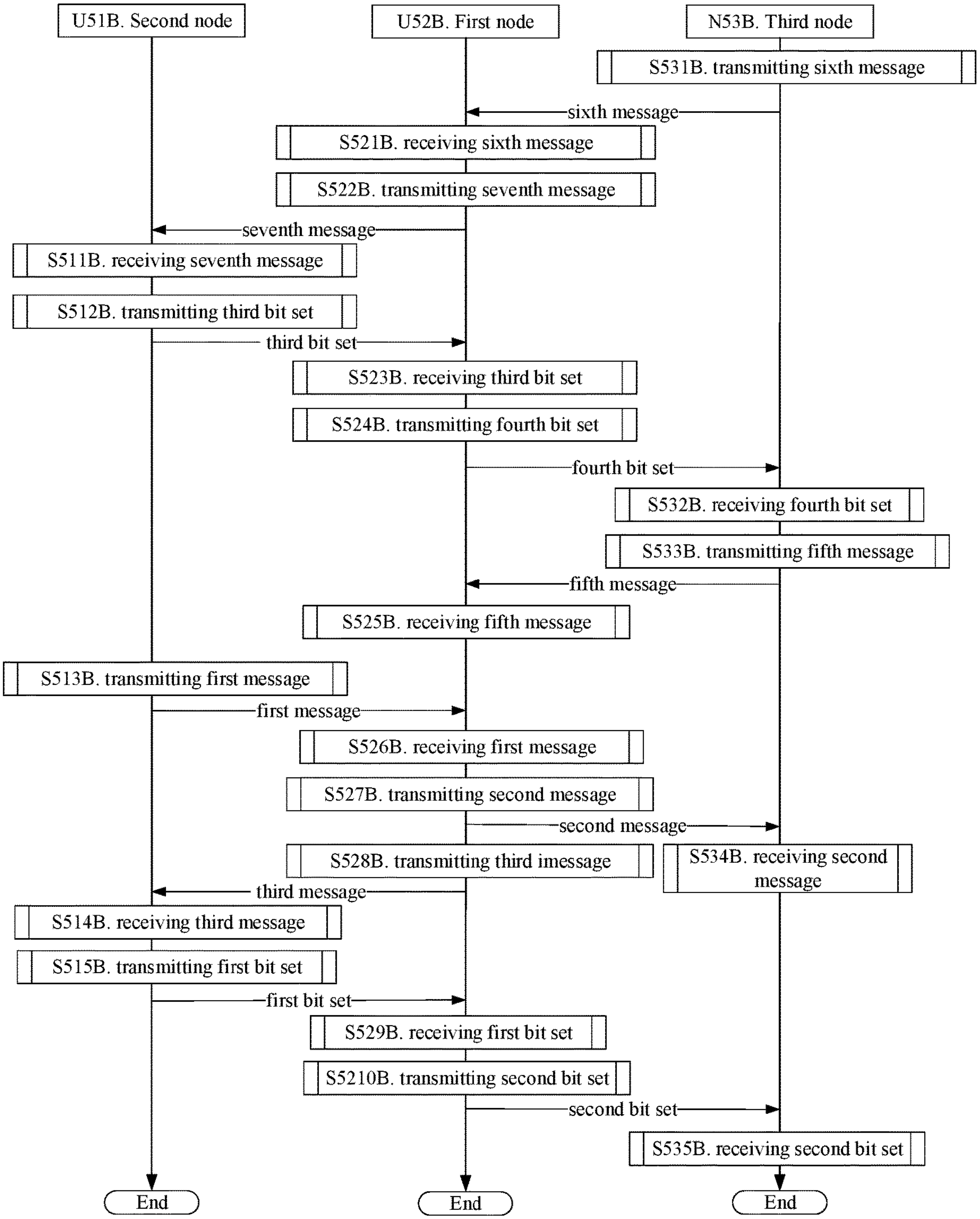
FIG. 5B illustrates a flowchart of radio signal transmission according to one embodiment of the present application.

Embodiment 5B illustrates a flowchart of a first radio signal transmission according to one embodiment in the present application, as shown in FIG. 5B. In FIG. 5B, a first node U52B and a second node U51B are in communications via a PC5 air interface; and a first node U52B and a third node N53B are in communications via a Uu air interface.

The second node U51B receives a seventh message in step S511B; transmits a third bit set in step S512B; transmits a first message in step S513B; receives a third message in step S514B; transmits a first bit set in step S515B.

The first node U52B receives a sixth message in step S521B; transmits a seventh message in step S522B; receives a third bit set in step S523B; transmits a fourth bit set in step S524B; receives a fifth message in step S525B; receives a first message in step S526B; transmits a second message in step S527B; transmits a third message in step S528B; receives a first bit set in step S529B; transmits a second bit set in step S5210B.

The third node N53B transmits a sixth message in step S531B; receives a fourth bit set in step S532B; transmits a fifth message in step S533B; receives a second message in step S534B; receives a second bit set in step S535B.

In one embodiment, a sixth message is received through downlink.

In one embodiment, the sixth message indicates an available relay mode of the first node.

In one embodiment, the sixth message explicitly indicates the available relay mode of the first node.

In one embodiment, the sixth message implicitly indicates the available relay mode of the first node.

In one embodiment, the sixth message implicitly indicates that the available relay mode of the first node is the L2 relay through configuring the ADAPT sublayer of the first node.

In one embodiment, the sixth message carries the available relay mode of the first node.

In one embodiment, the sixth message is generated at a Radio Resource Control (RRC) sublayer.

In one embodiment, the sixth message comprises an RRC message.

In one embodiment, the sixth message comprises all or partial IEs in an RRC message.

In one embodiment, the sixth message comprises all or partial fields in an IE in an RRC message.

In one embodiment, a name of the sixth message comprises relay.

In one embodiment, the sixth message is an RRCReconfiguration.

In one embodiment, the first node determines the first target RRC state based on the sixth message and the first message.

In one embodiment, the first node determines the first target RRC state based on the available relay mode of the first node indicated by the sixth message and the relay mode indicated by the first message.

In one embodiment, when the relay mode available to the first node indicated by the sixth information is at least a former of the L2 relay or the L3 relay, and the relay mode indicated by the first information is the L2 relay, it is determined that the first target RRC state is the RRC_CONNECTED state.

In one embodiment, when the available relay mode of the first node indicated by the sixth message is at least a former of the L3 relay or the L2 relay, and the relay mode indicated by the first message is the L3 relay, it is determined that the first target RRC state is the RRC_CONNECTED state.

In one embodiment, when the available relay mode of the first node indicated by the sixth message is at least a former of the L3 relay or the L2 relay, and the relay mode indicated by the first message is the L3 relay, it is determined that the first target RRC state is the RRC_INACTIVE state.

In one embodiment, when the available relay mode of the first node indicated by the sixth message is the L2 relay, and the relay mode indicated by the first message is the L2 relay and the L3 relay, it is determined that the first target RRC state is the RRC_CONNECTED state.

In one embodiment, when the available relay mode of the first node indicated by the sixth message is the L3 relay, and the relay mode indicated by the first message is the L2 relay and the L3 relay, it is determined that the first target RRC state is the RRC_CONNECTED state.

In one embodiment, when the available relay mode of the first node indicated by the sixth message is the L3 relay, and the relay mode indicated by the first message is the L2 relay and the L3 relay, it is determined that the first target RRC state is the RRC_INACTIVE state.

In one embodiment, the first node determines the first target RRC state based on the available relay mode of the first node indicated by the sixth message and the signaling type comprised in the first message; the signaling type comprises either a PC5 signaling or a Uu signaling.

In one embodiment, when the available relay mode of the first node indicated by the sixth message is at least one of the L2 relay or L3 relay and the first message is a PC5 signaling, it is determined that the first target RRC state is the RRC_CONNECTED state.

In one embodiment, when the available relay mode of the first node indicated by the sixth message is at least one of the L2 relay or L3 relay and the first message is a PC5 signaling, it is determined that the first target RRC state is the RRC_INACTIVE state.

In one embodiment, when the available relay mode of the first node indicated by the sixth message is at least one of the L2 relay or L3 relay and the first message is a Uu signaling, it is determined that the first target RRC state is the RRC_CONNECTED state.

In one embodiment, when the available relay mode of the first node indicated by the sixth message is at least one of the L2 relay or L3 relay, and the first message is a Uu signaling, it is determined that the first target RRC state is the RRC_INACTIVE state.

In one embodiment, when the available relay mode of the first node indicated by the sixth message is at least one of the L2 relay or L3 relay and the first message is an RRCSetupRequest, it is determined that the first target RRC state is the RRC_CONNECTED state.

In one embodiment, when the available relay mode of the first node indicated by the sixth message is at least one of the L2 relay or L3 relay, and the first message is either an RRCResumeRequest or an RRCResumeRequest1, it is determined that the first target RRC state is the RRC_CONNECTED state.

In one embodiment, when the available relay mode of the first node indicated by the sixth message is at least one of the L2 relay or L3 relay, and the first message is either an RRCResumeRequest or an RRCResumeRequest1, it is determined that the first target RRC state is the RRC_INACTIVE state.

In one embodiment, a seventh message is transmitted through sidelink.

In one embodiment, a receiver of the seventh message and the transmitter of the first message are co-located.

In one embodiment, the seventh message indicates a relay mode supported by the first node.

In one embodiment, the available relay mode indicated by the sixth message comprises the supported relay mode indicated by the seventh message.

In one embodiment, the available relay mode of the first node indicated by the sixth message comprises the supported relay mode of the first node indicated by the seventh message.

In one embodiment, the seventh message explicitly indicates the relay mode supported by the first node.

In one embodiment, the seventh message implicitly indicates the relay mode supported by the first node.

In one embodiment, the seventh message carries the relay mode supported by the first node.

In one embodiment, the seventh message is generated at the PC5-RRC sublayer.

In one embodiment, the seventh message comprises a PC5-RRC message.

In one embodiment, the seventh message comprises all or partial IEs in a PC5-RRC message.

In one embodiment, the seventh message comprises all or partial fields in an IE in a PC5-RRC message.

In one embodiment, a name of the seventh message comprises relay.

In one embodiment, the seventh message is RRCReconfigurationSidelink.

In one embodiment, the transmitter of the first message generates the first message based on the seventh message.

In one embodiment, when the seventh message indicates that the relay mode supported by the first node is the L2 relay, the first message comprises a PC5 signaling.

In one embodiment, when the seventh message indicates that the relay mode supported by the first node is the L2 relay, the first message comprises a Uu signaling.

In one embodiment, when the seventh message indicates that the relay mode supported by the first node is the L3 relay, the first message comprises a PC5 signaling.

In one embodiment, when the seventh message indicates that the relay mode supported by the first node is the L3 relay, the first message comprises a Uu signaling.

In one embodiment, when the seventh message indicates that the relay mode supported by the first node is the L2 relay, the first message indicates the L2 relay.

In one embodiment, when the seventh message indicates that the relay mode supported by the first node is the L3 relay, the first message indicates the L3 relay.

In one embodiment, before receiving the first message, a third bit set is received through sidelink.

In one embodiment, a transmitter of the third bit set and the transmitter of the first message are co-located.

In one embodiment, the third bit set belongs to a data radio bearer (DRB).

In one embodiment, the third bit set and the first bit set belong to a same data radio bearer.

In one embodiment, the third bit set and the first bit set belong to different data radio bearers.

In one embodiment, before receiving the first message, the fourth bit set is generated and is transmitted through uplink.

In one embodiment, the fourth bit set comprises the third bit set.

In one embodiment, the fourth bit set belongs to a data radio bearer.

In one embodiment, the fourth bit set comprises at least one byte other than the third bit set.

In one embodiment, the fourth bit set and the third bit set respectively comprise at least one byte.

In one embodiment, the fourth bit set and the third bit set respectively comprise a positive integer number of bit(s).

In one embodiment, the fourth bit set and the third bit set respectively comprise at least one RLC SDU.

In one embodiment, the fourth bit set and the third bit set respectively comprise at least one PDCP SDU.

In one embodiment, the fourth bit set and the second bit set belong to a same data radio bearer.

In one embodiment, the fourth bit set and the second bit set belong to different data radio bearers.

In one embodiment, before receiving the first message and after a fourth bit set being transmitted, a fifth message is received through downlink.

In one embodiment, the fifth message is generated at the RRC sublayer.

In one embodiment, the fifth message comprises an RRC message.

In one embodiment, the fifth message comprises all or partial IEs in an RRC message.

In one embodiment, the fifth message comprises all or partial fields in an IE in an RRC message.

In one embodiment, the fifth message is an RRCRelease.

In one embodiment, the fifth message is used to indicate that the first node enters into a second target RRC state, and the first node is in the second target RRC state when receiving the first message.

In one embodiment, the second target RRC state is one of the RRC_INACTIVE state and the RRC_CONNECTED state, and the second target RRC state is different from the first target RRC state.

In one embodiment, only one of the behavior of generating a second bit set and the behavior of generating a fourth bit set being in the RRC_INACTIVE state comprises generating at least one PDCP PDU header, a corresponding bit set comprises the at least one PDCP PDU header, and any PDCP PDU header in the at least one PDCP PDU header comprises a PDCP sequence number.

In one embodiment, the behavior of generating a fourth bit set is in the RRC_CONNECTED state; the behavior of generating a second bit set is in the RRC_INACTIVE state; the behavior of generating a second bit set comprises generating at least one PD CP PDU header, a corresponding bit set comprises at least one PD CP PDU header, and any PDCP PDU header in the at least one PDCP PDU header comprises a PDCP sequence number.

In one embodiment, the behavior of generating a fourth bit set is in the RRC_INACTIVE state; the behavior of generating a second bit set is in the RRC_INACTIVE state; the behavior of generating a fourth bit set comprises generating at least one PDCP PDU header, a corresponding bit set comprises the at least one PDCP PDU header, and any PDCP PDU header in the at least one PDCP PDU header comprises a PDCP sequence number; the behavior of generating a second bit set comprises generating at least one PDCP PDU header, a corresponding bit set comprises the at least one PDCP PDU header, and any PDCP PDU header in the at least one PDCP PDU header comprises a PDCP sequence number.

In one embodiment, the second target RRC state is RRC state in which the first message is received.

In one embodiment, the fourth bit set and the second bit set are transmitted through a same RLC bearer.

In one embodiment, a logical channel identity comprised in a subheader of a MAC PDU comprising at least partial bits in the fourth bit set is the same as a logical channel identity comprised in a subheader of a MAC PDU comprising at least partial bits in the second bit set.

In one embodiment, the first node being pending in the second target RRC state is used for an RLC bearer transmitted by the fourth bit set; after determining the first target RRC state, the RLC bearer used for a transmission of the fourth bit set is activated to transmit the second bit set.

In one embodiment, the behavior of pending an RLC bearer used for the fourth bit set transmission comprises maintaining context of the RLC bearer used to transmit the fourth bit set.

In one embodiment, the fourth bit set and the second bit set are transmitted through a same RLC bearer; the behavior of generating a fourth bit set is in the RRC_INACTIVE state; the behavior of generating the second bit set is in the RRC_CONNECTED state.

In one embodiment, the fourth bit set and the second bit set are transmitted through a same RLC bearer; the behavior of generating a fourth bit set is in the RRC_INACTIVE state; the behavior of generating a second bit set is in the RRC_CONNECTED state; a PDCP entity associated with the RLC bearer of the fourth bit set is located at the first node; a PDCP entity associated with the RLC bearer of the second bit set is located at the second node.

In one embodiment, the fourth bit set and the second bit set are transmitted through a same RLC bearer; the behavior of generating a fourth bit set is in the RRC_CONNECTED state; the behavior of generating a second bit set is in the RRC_INACTIVE state.

In one embodiment, the fourth bit set and the second bit set are transmitted through a same RLC bearer; the behavior of generating a fourth bit set is in the RRC_CONNECTED state; the behavior of generating a second bit set is in the RRC_INACTIVE state; a PDCP entity associated with the RLC bearer of the fourth bit set is located at the second node; a PDCP entity associated with the RLC bearer of the second bit set is located at the first node.

In one embodiment, the RLC bearer being associated with the PDCP entity comprises: a PDCP entity is configured to belong to a radio carrier, the radio bearer is identified by radio bearer identities, and the radio bearer identities simultaneously indicate an RLC bearer.

In one embodiment, for the RRC_INACTIVE state and the RRC_CONNECTED state, only when the first target RRC state is the RRC_INACTIVE state, the behavior of generating the second bit set comprises generating at least one PDCP PDU header, the second bit set comprises at least one PDCP PDU header, and any PDCP PDU header in the at least one PDCP PDU header comprises a PDCP sequence number.

In one embodiment, when the first target RRC state is RRC_CONNECTED state, the behavior of generating a second bit set is executed in a layer below the PDCP sublayer.

In one embodiment, a layer below the PDCP sublayer comprises an ADAPT sublayer.

In one embodiment, a layer below the PDCP sublayer comprises an RLC sublayer.

In one embodiment, a layer below the PDCP sublayer comprises a MAC sublayer.

In one embodiment, only when the first target RRC state is the RRC_INACTIVE state, the second bit set is transmitted through the L3 relay.

In one embodiment, when the second bit set is transmitted through the L3 relay, the behavior of generating the second bit set comprises generating at least one PDCP PDU header, the second bit set comprises at least one PDCP PDU header, and any PDCP PDU header in the at least one PDCP PDU header comprises a PDCP sequence number.

In one embodiment, when the second bit set is transmitted through the L3 relay, the second bit set is processed by the PDCP sublayer.

In one embodiment, when the second bit set is transmitted through the L3 relay, the second bit set is not processed by the ADAPT sublayer.

In one embodiment, the PDCP PDU header is generated at the PDCP sublayer.

In one embodiment, a PDCP PDU header comprises a PDCP sequence number.

In one embodiment, the PDCP sequence number comprises 12 bits.

In one embodiment, the PDCP sequence number comprises 18 bits.

In one embodiment, the PDCP sequence number is a positive integer not less than 0.

In one embodiment, a third message is transmitted through sidelink; herein, the second message is transmitted through cellular link, and the third message is used to indicate that a transmitter of the first message enters into or maintains the first target RRC state.

In one embodiment, the third message is used to confirm that the transmitter of the first message enters into the first target RRC state.

In one embodiment, the third message is generated at the PC5-RRC sublayer.

In one embodiment, the third message comprises a PC5-RRC message.

In one embodiment, the third message belongs to a PC5-S message.

In one embodiment, the third message comprises all or partial IEs in a PC5-RRC message.

In one embodiment, the third message comprises all or partial fields in an IE in a PC5-RRC message.

In one embodiment, the third message belongs to a signaling bearer.

In one embodiment, the third message belongs to a sidelink signaling bearer.

In one embodiment, the third message comprises RRCReconfigurationSidelink.

In one embodiment, the third message comprises RRCResumeSidelink.

In one embodiment, RRC state that the transmitter of the first message is in when transmitting the first message is different from the first target RRC state, and the third message is used to indicate that the transmitter of the first message enters into the first target RRC state.

In one embodiment, RRC state that the transmitter of the first message is in when transmitting the first message is the same as the first target RRC state, and the third message is used to indicate that the transmitter of the first message maintains the first target RRC state.

In one embodiment, the RRC state is either the inactive RRC_INACTIVE state or the RRC_CONNECTED state.

In one embodiment, the second message is used to request that the transmitter of the first message enters into the first target RRC state.

In one embodiment, the second message is used to request the first node entering into the first target RRC state.

In one embodiment, the second message is used to request that the first node enters into the first target RRC state as well as the transmitter of the first message enters into the first target RRC state.

In one embodiment, the third message being used to indicate that the transmitter of the first message enters into or maintains the first target RRC state comprises: when the transmitter of the first message is in RRC_INACTIVE state when transmitting the first message, the third message is used to indicate that the transmitter of the first message enters into the RRC_CONNECTED state.

In one embodiment, the third message being used to indicate that the transmitter of the first message enters into or maintains the first target RRC state comprises: when the transmitter of the first message is in the RRC_INACTIVE state during a transmission of the first message, the third message is used to indicate that the transmitter of the first message maintains the RRC_INACTIVE state.

In one embodiment, the third message being used to indicate that the transmitter of the first message enters into or maintains the first target RRC state comprises: when the transmitter of the first message is in the RRC_CONNECTED state during a transmission of the first message, the third message is used to indicate that the transmitter of the first message enters into the RRC_INACTIVE state.

In one embodiment, the third message being used to indicate that the transmitter of the first message enters into or maintains the first target RRC state comprises: when the transmitter of the first message is in the RRC_CON- NECTED state during a transmission of the first message, the third message is used to indicate that the transmitter of the first message maintains the RRC_CONNECTED state.

In one embodiment, the transmitter of the first message transmits a third bit set through sidelink before transmitting the first message, and receives an eighth message through sidelink before transmitting the first message.

In one embodiment, the eighth message is used to indicate that the transmitter of the first message enters into a third target RRC state, the transmitter of the first message is in the third target RRC state when transmitting the first message, and the third target RRC state is either the RRC_INACTIVE state or the RRC_CONNECTED state.

In one embodiment, the third target RRC state is the RRC_INACTIVE state, and the behavior of transmitting the first message is in the RRC_INACTIVE state.

Embodiment 6A

Figure 6A:
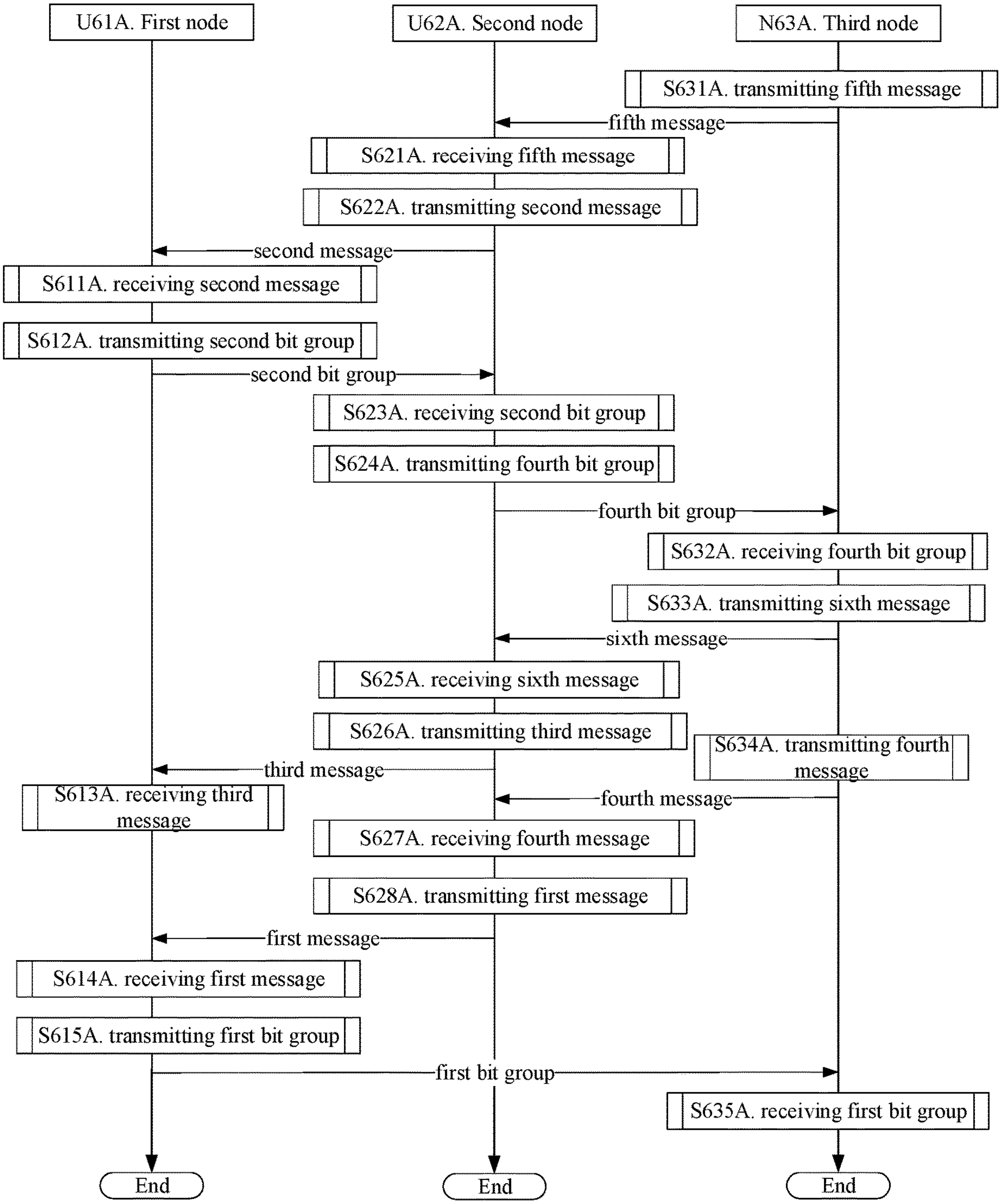
FIG. 6A illustrates another flowchart of radio signal transmission according to one embodiment of the present application.

Embodiment 6A illustrates another flowchart of radio signal transmission according to one embodiment in the present application, as shown in FIG. 6A. In FIG. 6A, a first node U61A and a second node U62A are in communications via a PC5 air interface; a second node U62A and a third node N63A are in communications via a Uu air interface; a first node U61A and a third node N63A are in communications via a Uu air interface.

The first node U61A receives a second message in step S611A; transmits a second bit group in step S612A; receives a third message in step S613A; receives a first message in step S614A; in step S615A, transmits a first bit group through cellular link.

The second node U62A receives a fifth message in step S621A; transmits a second message in step S622A; receives a second bit group in step S623A; transmits a fourth bit group in step S624A; receives a sixth message in step S625A; transmits a third message in step S626A; receives a fourth message in step S627A; transmits a first message in step S628A.

The third node N63A transmits a fifth message in step S631A; receives a fourth bit group in step S632A; transmits a sixth message in step S633A; transmits a fourth message in step S634A; receives a first bit group through cellular link in step S635A.

In one embodiment, the first node adopts a candidate transmission mode transmitted through cellular link to transmit the first bit group; the third node receives the first bit group through cellular link.

In one embodiment, when the first transmission mode is a transmission through cellular link, the first bit group is transmitted through the third RLC bearer.

In one embodiment, the third RLC bearer is identified by the third logical channel identity.

In one embodiment, when the first transmission mode is through cellular link, the first bit group being transmitted through a third RLC bearer comprises: the first bit group comprising the third logical channel identity.

In one embodiment, when the first transmission mode is a transmission through cellular link, the first bit group being transmitted through a third RLC bearer comprises: before the first bit group is transmitted through the third RLC bearer, activating the third RLC bearer.

In one embodiment, when the first transmission mode is a transmission through cellular link, the first bit group being transmitted through a third RLC bearer comprises: before the first bit group is transmitted through the third RLC bearer, an RLC entity of the third RLC bearer being established.

In one embodiment, the third RLC bearer is used for a cellular link transmission between the first node and a serving base station of the first node.

Embodiment 6B

Figure 6B:
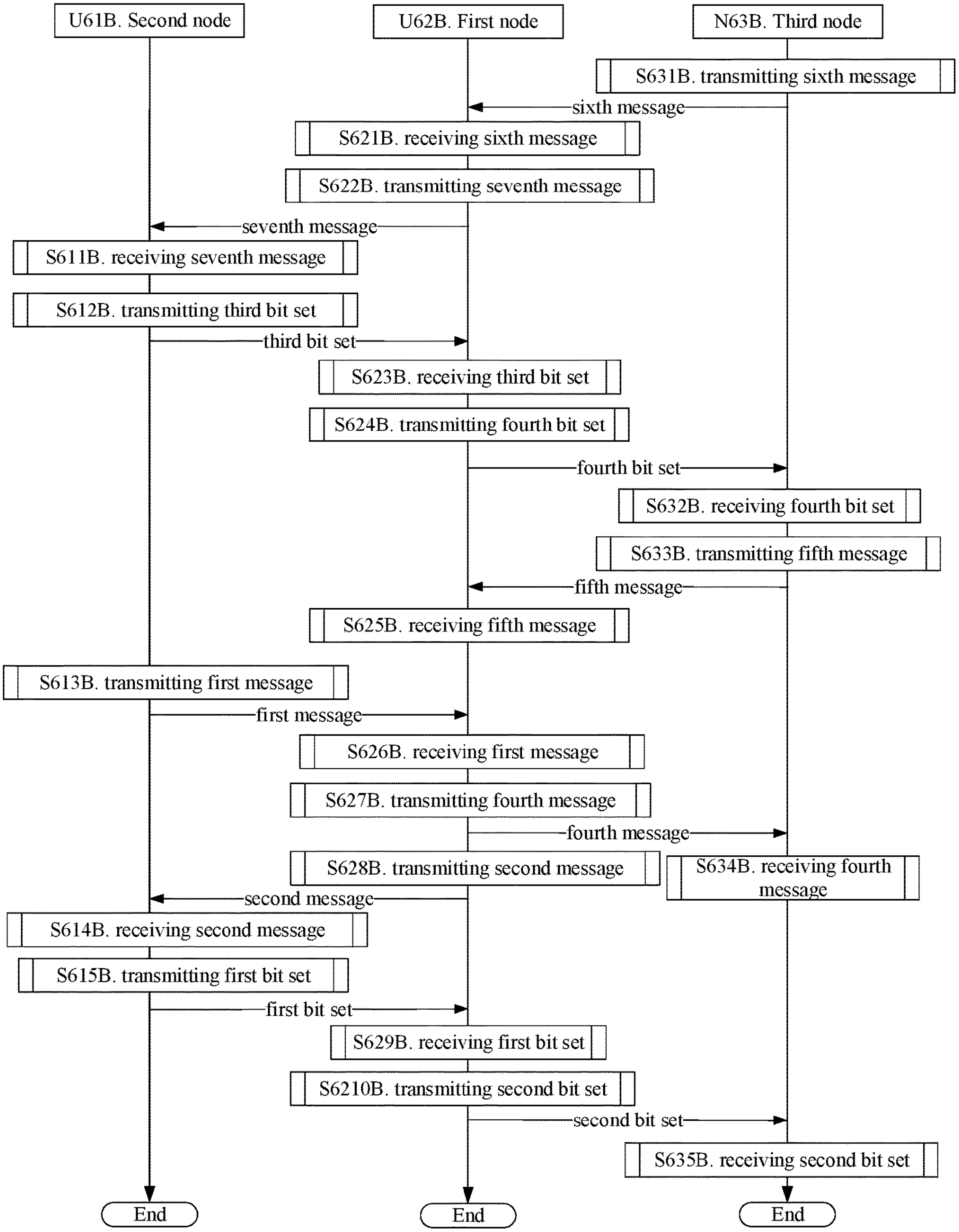
FIG. 6B illustrates a second flowchart of radio signal transmission according to one embodiment of the present application.

Embodiment 6B illustrates a flowchart of a second radio signal transmission according to one embodiment of the present application, as shown in FIG. 6B. In FIG. 6B, a first node U62B and a second node U61B are in communications via a PC5 air interface; a first node U62B and a third node N63B are in communications via a Uu air interface.

The second node U61B receives a seventh message in step S611B; transmits a third bit set in step S612B; transmits a first message in step S613B; receives a second message in step S614B; transmits a first bit set in step S615B.

The first node U62B receives a sixth message in step S621B; transmits a seventh message in step S622B; receives a third bit set in step S623B; transmits a fourth bit set in step S624B; receives a fifth message in step S625B; receives a first message in step S626B; transmits a fourth message in step S627B; transmits a second message in step S628B; receives a first bit set in step S629B; transmits a second bit set in step S6210B.

The third node N63B transmits a sixth message in step S631B; receives a fourth bit set in step S632B; transmits a fifth message in step S633B; receives a fourth message in step S634B; receives a second bit set in step S635B.

In one embodiment, a fourth message is transmitted through uplink; herein, the second message is transmitted through sidelink, and the fourth message is used to indicate that the first node enters into or maintains the first target RRC state.

In one embodiment, a fourth message is transmitted through uplink; herein, the second message is transmitted through sidelink, and the fourth message is used to indicate that the transmitter of the first message enters into or maintains the first target RRC state.

In one embodiment, a fourth message is transmitted through uplink; herein, the second message is transmitted through sidelink, and the fourth message is used to indicate that the first node enters into or maintains the first target RRC state, and the fourth message is used to indicate that the transmitter of the first message enters into or maintains the first target RRC state.

In one embodiment, the second message is used to confirm that the transmitter of the first message enters into the first target RRC state.

In one embodiment, the fourth message is used to request that the first node enters into the first target RRC state.

In one embodiment, the fourth message is used to request that the transmitter of the first message enters into the first target RRC state.

In one embodiment, the fourth message is used to request that the first node enters into the first target RRC state as well as request that the transmitter of the first message enters into the first target RRC state.

In one embodiment, the fourth message is generated at the RRC sublayer.

In one embodiment, the fourth message comprises an RRC message.

In one embodiment, the fourth message comprises all or partial IEs in an RRC message.

In one embodiment, the fourth message comprises all or partial fields in an IE in RRC message.

In one embodiment, the fourth message comprises an RRCSetupRequest.

In one embodiment, the fourth message comprises an RRCResumeRequest.

In one embodiment, the fourth message comprises an RRCResumeRequest1.

In one embodiment, the fourth message comprises an RRCSetupRequest_Relay.

In one embodiment, the fourth message comprises an RRCResumeRequest_Relay.

In one embodiment, the fourth message comprises an RRCResumeRequest1_Relay.

In one embodiment, the fourth message belongs to a signaling bearer.

In one embodiment, the fourth message comprises an RRCReconfigurationSidelink message.

In one embodiment, RRC state that the first node is in when receiving the first message is different from the first target RRC state, and the fourth message is used to indicate that the first node enters into the first target RRC state.

In one embodiment, RRC state that the first node is in when receiving the first message is the same as the first target RRC state, and the fourth message is used to indicate that the first node maintains the first target RRC state.

In one embodiment, RRC state that the transmitter of the first message is in when transmitting the first message is different from the first target RRC state, and the fourth message is used to indicate that the transmitter of the first message enters into the first target RRC state.

In one embodiment, RRC state that the transmitter of the first message is in when transmitting the first message is the same as the first target RRC state, and the fourth message is used to indicate that the transmitter of the first message maintains the first target RRC state.

In one embodiment, the RRC state is either the RRC_INACTIVE state or the RRC_CONNECTED state.

In one embodiment, the fourth message being used to indicate that the first node enters into or maintains the first target RRC state comprises: when the first node is in the RRC_INACTIVE state when receiving the first message, the fourth message is used to indicate that the first node enters into the RRC_CONNECTED state.

In one embodiment, the fourth message being used to indicate that the first node enters into or maintains the first target RRC state comprises: when the first node is in the RRC_INACTIVE state when receiving the first message, the fourth message is used to indicate that the first node maintains the RRC_INACTIVE state.

In one embodiment, the fourth message being used to indicate that the first node enters into or maintains the first target RRC state comprises: when the first node is in the RRC_CONNECTED state when receiving the first message, the fourth message is used to indicate that the first node maintains the RRC_CONNECTED state.

In one embodiment, the fourth message being used to indicate that the transmitter of the first message enters into or maintains the first target RRC state comprises: when the transmitter of the first message is in the RRC_INACTIVE state when transmitting the first message, the fourth message is used to indicate that the transmitter of the first message enters into the RRC_CONNECTED state.

In one embodiment, the fourth message being used to indicate that the transmitter of the first message enters into or maintains the first target RRC state comprises: when the transmitter of the first message is in the RRC_INACTIVE state when transmitting the first message, the fourth message is used to indicate that the transmitter of the first message maintains the RRC_INACTIVE state.

In one embodiment, the fourth message being used to indicate that the transmitter of the first message enters into or maintains the first target RRC state comprises: when the transmitter of the first message is in the RRC_CONNECTED state when transmitting the first message, the fourth message is used to indicate that the transmitter of the first message maintains the RRC_CONNECTED state.

Embodiment 7A

Figure 7A:
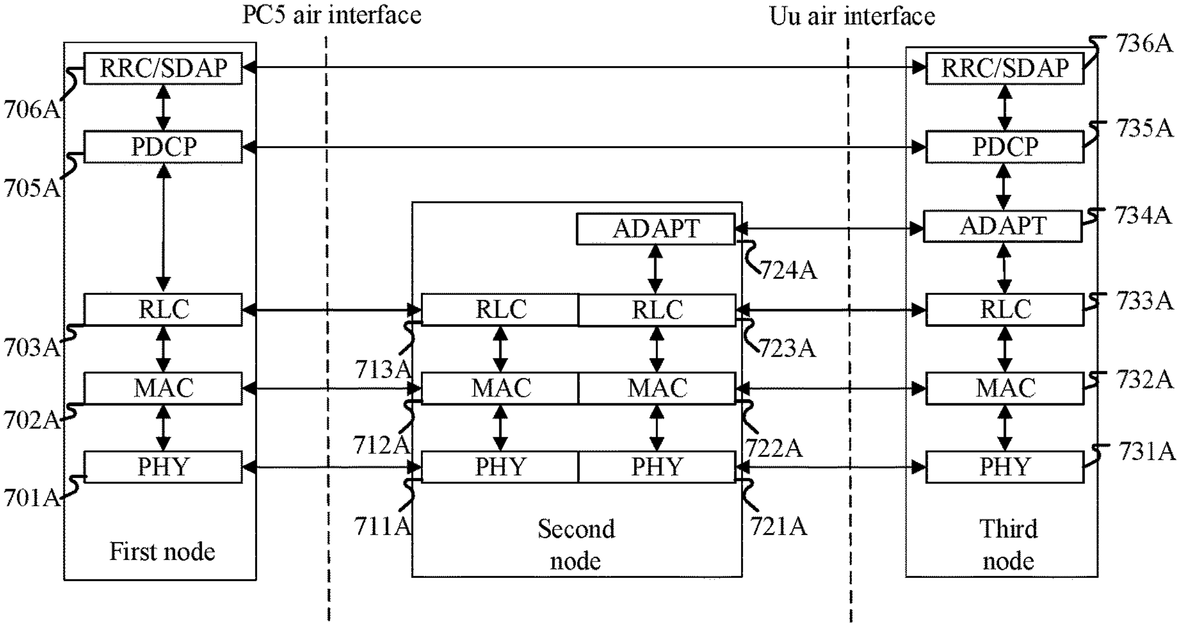
FIG. 7A illustrates a schematic diagram of a radio protocol architecture of relay transmission according to one embodiment of the present application.

Embodiment 7A illustrates a schematic diagram of a radio protocol architecture of relay transmission according to one embodiment of the present application, as shown in FIG. 7A.

In FIG. 7A, in relay transmission, taking data transmitted from the first node to the third node via the second node as an example (data transmitted from the third node to the first node via the second node is the same): first target data is sequentially processed by the PDCP sublayer 705A and RLC sublayer 703A at the first node side to generate a first target MAC PDU at the MAC sublayer 702A, which is then transferred to the PHY layer 701A, then transmitted to the PHY layer 711A of the second node via the PC5 air interface, and then processed by the MAC sublayer 712A and the RLC sublayer 713A to recover a first RLC SDU; the first RLC SDU is processed by the ADAPT sublayer 724A to generate a second RLC SDU, and then is processed by the RLC sublayer 723A and the MAC sublayer 722A to generate a second target MAC PDU to be transferred to the PHY layer 721A, then is transmitted to the PHY layer 731A of the third node via the Uu air interface to the second target MAC PDU through the MAC sublayer 732A, after being processed by the RLC sublayer 733A, the second RLC SDU is recovered, and then the first target data is recovered through the processing of the ADAPT sublayer 734A and the PDCP sublayer 735A.

In one embodiment, the transmitting and receiving ends of the first RLC bearer are respectively the first node and the second node.

In one embodiment, the transmitting and receiving ends of the second RLC bearer are respectively the second node and the third node.

In one embodiment, the phrase of transmitting through the first RLC bearer comprises: transmitting through an RLC entity 703A of the first node and receiving through an RLC entity 713A of the second node, or transmitting through an RLC entity 713A of the second node and receiving through an RLC entity 703A of the first node; both the RLC entity 703A and the RLC entity 713A belong to the first RLC bearer.

In one embodiment, the phrase of transmitting through the second RLC bearer comprises: transmitting through an RLC entity 723A of the second node and receiving through an RLC entity 733A of the third node, or transmitting through an RLC entity 733A of the third node and receiving through an RLC entity 723A of the second node; both the RLC entity 723A and the RLC entity 723A belong to the second RLC bearer.

In one embodiment, the ADAPT sublayer implements bearer mapping function.

In one embodiment, the ADAPT sublayer maintains a mapping relation table between the first RLC bearer and the second RLC bearer.

In one embodiment, the ADAPT sublayer identifies the first RLC bearer and the second RLC bearer through the first logical channel identity and the second logical channel identity.

In one embodiment, the bearer mapping function comprises: transmitting data received from the first RLC bearer through the second RLC bearer; or transmitting data received from the second RLC bearer through the first RLC bearer.

In one embodiment, for the transmission of data belonging to the target carrier from the terminal to the network, the second node maintains an ingress-RLC channel comprised in the first RLC bearer and an egress-RLC channel comprised in the second RLC bearer.

In one embodiment, the bearer mapping function comprises: transmitting data received from any RLC bearer in the fourth RLC bearer set through the second RLC bearer; or transmitting data received from the second RLC bearer respectively through an RLC bearer in the fourth RLC bearer set.

In one embodiment, data received from the first RLC bearer is processed by the ADAPT sublayer and transmitted through the second RLC bearer.

In one embodiment, data received from any RLC bearer in the fourth RLC bearer set is processed by the ADAPT sublayer and transmitted through the second RLC bearer.

In one embodiment, the phrase that the second RLC bearer correspond to the target bearer comprises: a data packet transmitted through the second RLC bearer comprises the target bearer identity.

In one embodiment, the first RLC SDU is transmitted through the first RLC bearer at the first node; the second node receives the first RLC SDU through the first RLC bearer; the first RLC SDU is processed by the ADAPT sublayer to generate the second RLC SDU, and the second RLC SDU comprises an ADAPT subheader; the second RLC SDU is transmitted through the second RLC bearer.

In one embodiment, the first bit group comprises the first RLC SDU; the third bit group comprises the second RLC SDU.

In one embodiment, the second bit group comprises the first RLC SDU; the fourth bit group comprises the second RLC SDU.

In one embodiment, a third RLC SDU is transmitted through a fifth RLC bearer at the third node; the third RLC SDU comprises the ADAPT sub-header; the second node receives the third RLC SDU through the fifth RLC bearer; the third RLC SDU is processed by the ADAPT sublayer to generate a fourth RLC SDU, and the fourth RLC SDU does not comprise the ADAPT subheader; the fourth RLC SDU is transmitted through a sixth RLC bearer.

In one embodiment, the third RLC SDU comprises the fifth message; the fourth RLC SDU comprises the second message.

In one embodiment, the third RLC SDU comprises the first RRC message comprised in the fifth message; the fourth RLC SDU comprises the second message.

In one embodiment, the third RLC SDU comprises the sixth message; the fourth RLC SDU comprises the third message.

In one embodiment, the fifth RLC bearer and the sixth RLC bearer are respectively lower layers of the signaling radio bearer.

In one embodiment, the fifth RLC bearer and the sixth RLC bearer are respectively lower layers of the data radio bearer.

In one embodiment, the fifth RLC bearer is a lower layer part of Signaling Radio Bearer 4 (SRB4).

In one embodiment, the sixth RLC bearer is a lower layer part of Signaling Radio Bearer 4 (SRB4).

In one embodiment, the ADAPT sublayer implements routing function.

In one embodiment, the ADAPT sublayer maintains a routing table from the first node to the third node.

In FIG. 7A, the routing function forwards a data packet received from the first node to the third node; or forwards a data packet received from the third node to the first node.

In FIG. 7A, the third node is a base station, the first node is a UE, and the second node is a relay node.

In FIG. 7A, the third node is a base station, the first node is an RSU, and the second node is a relay node.

Embodiment 7B

Figure 7B:
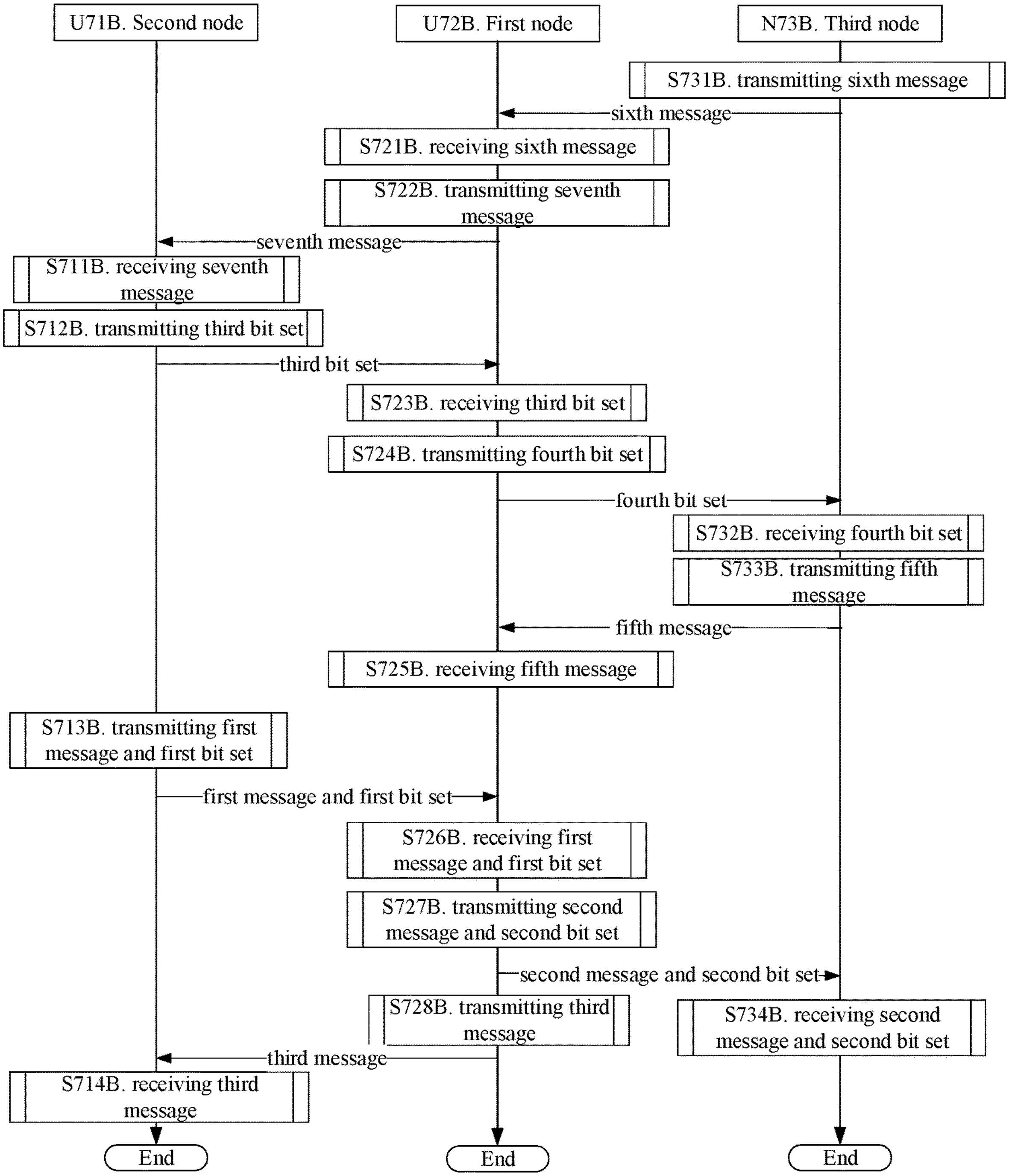
FIG. 7B illustrates a third flowchart of radio signal transmission according to one embodiment of the present application.

Embodiment 7B illustrates a third flowchart of radio signal transmission according to one embodiment of the present application, as shown in FIG. 7B. In FIG. 7B, a first node U72B and a second node U71B are in communications via a PC7 air interface; a first node U72B and a third node N73B are in communications via a Uu air interface.

The second node U71B receives a seventh message in step S711B; transmits a third bit set in step S712B; transmits a first message and a first bit set in step S713B; receives a third message in step S714B.

The first node U72B receives a sixth message in step S721B; transmits a seventh message in step S722B; receives a third bit set in step S723B; transmits a fourth bit set in step S724B; receives a fifth message in step S725B; receives a first message and a first bit set in step S726B; transmits a second message and a second bit set in step S727B; transmits a third message in step S728B.

The third node N73B transmits a sixth message in step S731B; receives a fourth bit set in step S732B; transmits a fifth message in step S733B; receives a second message and a second bit set in step S734B.

In one embodiment, a reception time of the first message is not later than a reception time of the first bit set.

In one embodiment, a reception time of the first message is the same as a reception time of the first bit set.

In one embodiment, the first message and the first bit set are received through different MAC PDUs.

In one embodiment, the first message and the first bit set are received through a same MAC PDU.

In step S713B of FIG. 7B, the second node transmits the first message and the first bit set in a same MAC PDU.

In one embodiment, a transmission time of the second message is not later than a transmission time of the second bit set.

In one embodiment, a transmission time of the second message is the same as a transmission time of the second bit set.

In one embodiment, the second message and the second bit set are transmitted through different MAC PDUs.

In one embodiment, the second message and the second bit set are transmitted through a same MAC PDU.

In step S727B of FIG. 7B, the first node transmits the second message and the second bit set in a same MAC PDU.

In one embodiment, the second node transmits the first message and the first bit set in a same MAC PDU; the first node transmits the second message and the second bit set in a same MAC PDU.

In one embodiment, the second node transmits the first message and the first bit set in a same MAC PDU; the first node transmits the second message and the second bit set in different MAC PDUs.

In one embodiment, the second node transmits the first message and the first bit set in different MAC PDUs; the first node transmits the second message and the second bit set in a same MAC PDU.

In one embodiment, the second node transmits the first message and the first bit set in different MAC PDUs; the first node transmits the second message and the second bit set in different MAC PDUs.

Embodiment 8A

Figure 8A:
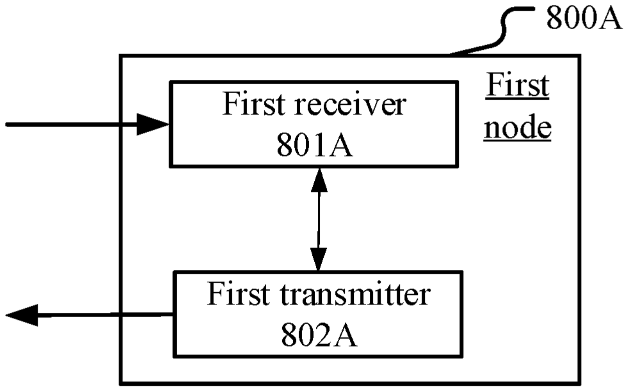
FIG. 8A illustrates a structure block diagram of a processor in a first node according to one embodiment of the present application.

Embodiment 8A illustrates a structure block diagram of a processor in a first node according to one embodiment of the present application, as shown in FIG. 8A.

In FIG. 8A, a processor 800A in a first node comprises a first receiver 801A and a first transmitter 802A. The first receiver 801A comprises at least one of the transmitter/receiver 454 (including the antenna 452), the receiving processor 456, the multi-antenna receiving processor 458 or the controller/processor 459 in FIG. 4 of the present application; the first transmitter 802A comprises at least one of the transmitter/receiver 454 (including the antenna 452), the transmitting processor 468, the multi-antenna transmitting processor 457, or the controller/processor 459 in FIG. 4 of the present application.

In embodiment 8A, the first receiver 801A receives a first message through sidelink; determines a first transmission mode based on at least the first message; the first transmitter 802A transmits a first bit group by adopting the first transmission mode, the first bit group comprises at least one bit; herein, the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied, the candidate transmission mode set comprises a candidate transmission mode of a transmission through sidelink.

In one embodiment, the first condition set comprises that the first message comprises RRC_CONNECTED state.

In one embodiment, the first message comprises a first threshold; the first condition set comprises that a first bit set with a data volume not less than a first threshold, and the first bit set comprises the first bit group.

In one embodiment, when the first transmission mode is the transmission through sidelink, the first bit group is transmitted through a first RLC bearer; when the first transmission mode is the transmission through cellular link, the first bit group is transmitted through a third RLC bearer; herein, the first RLC bearer and the third RLC bearer respectively correspond to a target bearer; the first bit group belongs to the target bearer.

In one embodiment, the first transmitter 802A transmits a second bit group through sidelink before receiving the first message; the first receiver 801A receives a second message before transmitting the second bit group; receives a third message through sidelink before receiving the first message and after transmitting the second bit group; herein, the second message configures the first RLC bearer; the third message is used to configure the third RLC bearer; the third message is used to indicate that the first node enters into RRC_INACTIVE state.

In one embodiment, the third message is transmitted before a fourth message; the fourth message indicates that the first RLC bearer is suspended.

In one embodiment, the fourth message is used to implicitly indicate that a second RLC bearer is suspended; herein, a fourth RLC bearer set is mapped to the second RLC bearer; the fourth RLC bearer set comprises the first RLC bearer; all RLC bearers in the fourth RLC bearers set are suspended; the second RLC bearer corresponds to the target bearer.

Embodiment 8B

Figure 8B:
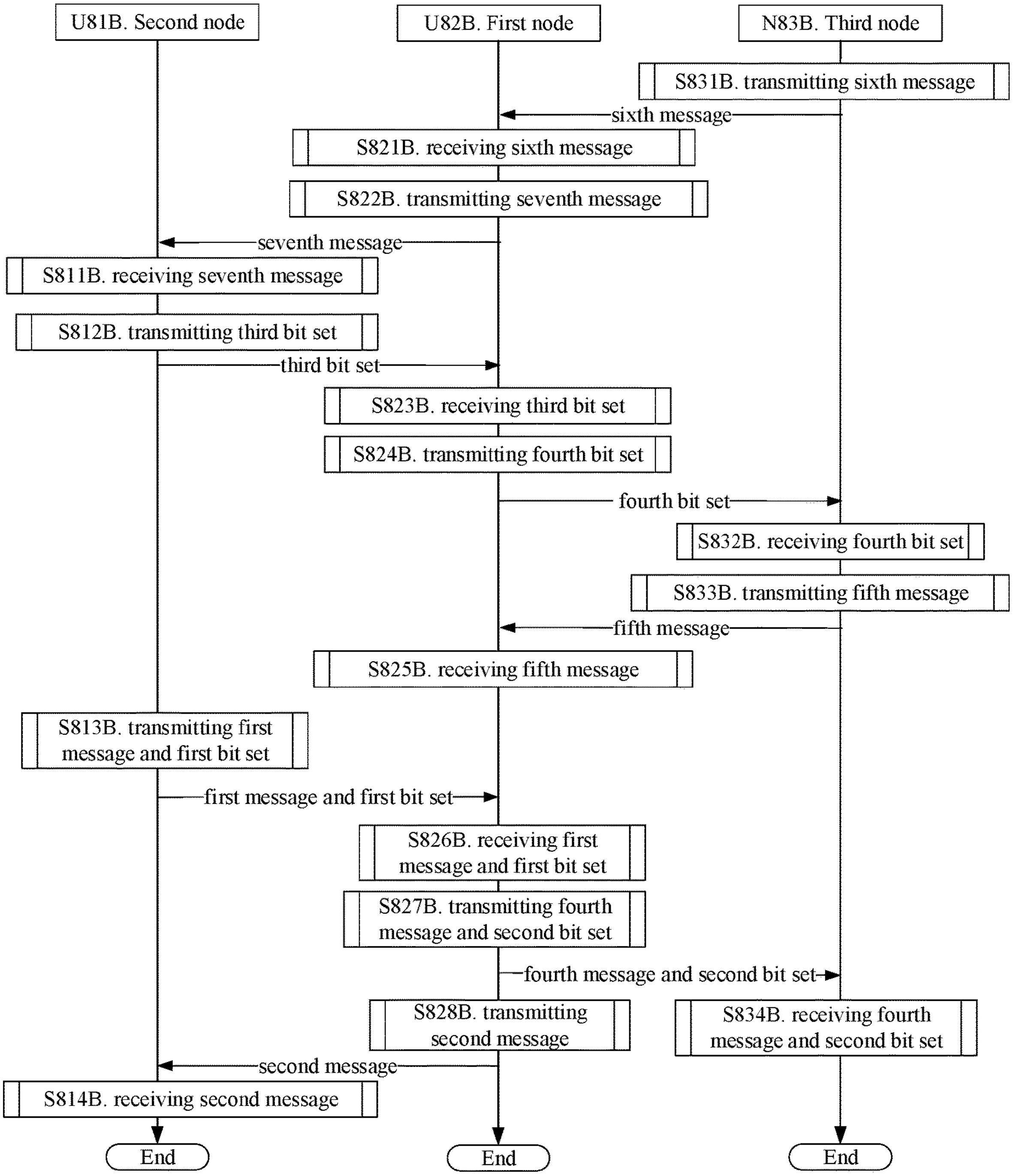
FIG. 8B illustrates a fourth flowchart of radio signal transmission according to one embodiment of the present application.

Embodiment 8B illustrates a flowchart of a fourth radio signal transmission according to one embodiment in the present application, as shown in FIG. 8B. In FIG. 8B, the first node U82B and the second node U81B are in communications via a PC5 air interface; the first node U82B and the third node N83B are in communications via a Uu air interface.

The second node U81B receives a seventh message in step S811B; transmits a third bit set in step S812B; transmits a first message and a first bit set in step S813B; receives a second message in step S814B.

The first node U82B receives a sixth message in step S821B; transmits a seventh message in step S822B; receives a third bit set in step S823B; transmits a fourth bit set in step S824B; receives a fifth message in step S825B; receives a first message and a first bit set in step S826B; transmits a fourth message and a second bit set in step S827B; transmits a second message in step S828B.

The third node N83B transmits a sixth message in step S831B; receives a fourth bit set in step S832B; transmits a fifth message in step S833B; receives a fourth message and a second bit set in step S834B.

In one embodiment, a transmission time of the fourth message is not later than a transmission time of the second bit set.

In one embodiment, a transmission time of the fourth message is the same as a transmission time of the second bit set.

In one embodiment, the fourth message and the second bit set are transmitted through different MAC PDUs.

In one embodiment, the fourth message and the second bit set are transmitted through a same MAC PDU.

In step S827B of FIG. 8B, the first node transmits the fourth message and the second bit set in a same MAC PDU.

In one embodiment, the second node transmits the first message and the first bit set in a same MAC PDU; the first node transmits the fourth message and the second bit set in a same MAC PDU.

In one embodiment, the second node transmits the first message and the first bit set in a same MAC PDU; the first node transmits the fourth message and the second bit set in different MAC PDUs.

In one embodiment, the second node transmits the first message and the first bit set in different MAC PDUs; the first node transmits the fourth message and the second bit set in a same MAC PDU.

In one embodiment, the second node transmits the first message and the first bit set in different MAC PDUs; the first node transmits the fourth message and the second bit set in different MAC PDUs.

Embodiment 9A

Figure 9A:
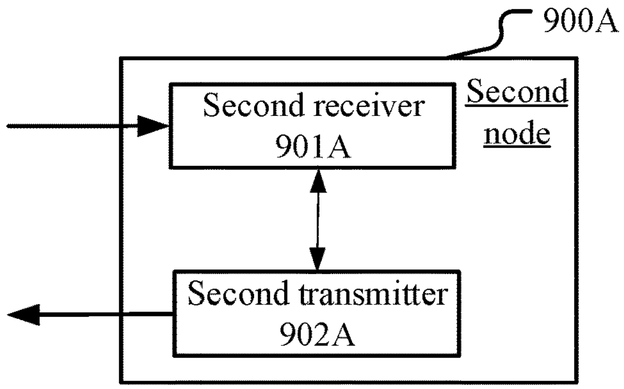
FIG. 9A illustrates a structure block diagram of a processor in a second node according to one embodiment of the present application.

Embodiment 9A illustrates a structure block diagram of a processor in a second node according to one embodiment of the present application, as shown in FIG. 9A.

In FIG. 9A, a processor 900A of a second node comprises a second receiver 901A and a second transmitter 902A. The second receiver 901A comprises at least one of the transmitter/receiver 418 (including the antenna 420), the receiving processor 470, the multi-antenna receiving processor 472 or the controller/processor 475 in FIG. 4 of the present application; the second transmitter 902A comprises at least one of the transmitter/receiver 418 (including the antenna 420), the transmitting processor 416, the multi-antenna transmitting processor 471 or the controller/processor 475 in FIG. 4 of the present application.

In one embodiment, the second transmitter 902A transmits a first message through sidelink; transmits a third bit group through cellular link; the second receiver 901A receives a first bit group through sidelink, the first bit group comprises at least one bit; herein, at least the first message is used to determine a first transmission mode; the first transmission mode is one transmission mode in a candidate transmission mode set, the candidate transmission mode set comprises a transmission through cellular link and a transmission through sidelink; the first message indicates a first condition set, and the first condition set comprises at least one condition; when condition(s) in the first condition set is(are) satisfied, the candidate transmission mode set comprises a candidate transmission mode of a transmission through sidelink; the third bit group comprises the first bit group.

In one embodiment, the first condition set comprises that the first message comprises RRC_CONNECTED state.

In one embodiment, the first message comprises a first threshold; the first condition set comprises that a first bit set with a data volume not less than a first threshold, and the first bit set comprises the first bit group.

In one embodiment, the first bit group is received through a first RLC bearer; herein, the first RLC bearer corresponds to a target bearer; the first bit group belongs to the target bearer.

In one embodiment, the second receiver 901A receives a second bit group through sidelink before transmitting the first message; receives a fifth message and a sixth message through cellular link; the second transmitter 902A transmits a second message before receiving the second bit group; transmits third message through sidelink before transmitting the first message and after receiving the second bit group; transmits a fourth bit group through cellular link after receiving the fifth message and before receiving the sixth message; herein, the fifth message is used to generate the second message; the fifth message configures the first RLC bearer and the second RLC bearer; the sixth message is used to generate the third message; the third message is used to configure a third RLC bearer; the third message is used to indicate that a receiver of the first message enters into RRC_INACTIVE state; the fourth bit group comprises the second bit group.

In one embodiment, the second receiver 901A receives a fourth message through cellular link; herein, the sixth message is received before the fourth message; the fourth message indicates that the first RLC bearer is suspended.

In one embodiment, the fourth message indicates that a second RLC bearer is suspended; herein, a fourth RLC bearer set is mapped to the second RLC bearer; the fourth RLC bearer set comprises the first RLC bearer; all RLC bearers in the fourth RLC bearers set are suspended; the second RLC bearer corresponds to the target bearer.

Embodiment 9B

Figure 9B:
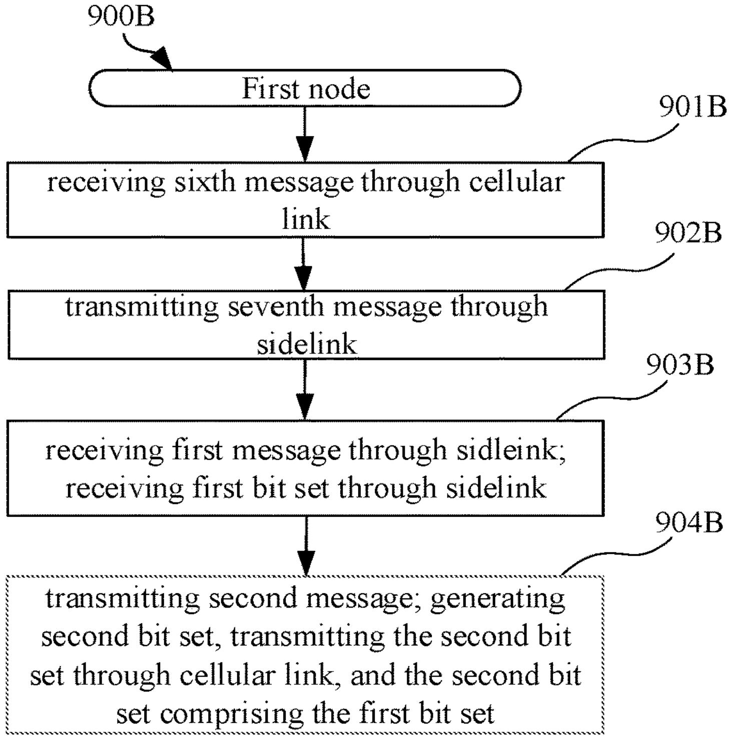
FIG. 9B illustrates another flowchart of transmission of a first node according to one embodiment of the present application.

Embodiment 9B illustrates another transmission flowchart of a first node according to one embodiment of the present application, as shown in FIG. 9B.

In embodiment 9B, the first node 900B receives a sixth message through cellular link in step 901B; transmits a seventh message through sidelink in step 902B; receives a first message through sidelink in step 903B; receives a first bit set through sidelink; transmits a second message in step 904B; generates a second bit set, transmits the second bit set through cellular link, and the second bit set comprises the first bit set; herein, the sixth message is used to generate the seventh message; the seventh message is used to generate the first message; the second message is used to indicate a first target RRC state, and the first target RRC state is one of RRC_INACTIVE state and RRC_CONNECTED state.

In one embodiment, the sixth message is used to generate the seventh message.

In one embodiment, the first node determines the relay mode supported by the first node based on the sixth message.

In one embodiment, the relay mode supported by the first node is used to generate the seventh message.

In one embodiment, the first node determines the relay mode supported by the first node based on the sixth message and UE capacity of the first node.

In one embodiment, the first node determines that the relay mode supported by the first node is implemented by the terminal device based on the sixth message.

In one embodiment, the relay mode comprised in the seventh message is a subset of the relay mode comprised in the sixth message.

In one embodiment, the relay mode comprised in the seventh is the same as the relay mode comprised in the sixth information.

In one embodiment, the relay mode comprised in the sixth message is not less than the relay mode comprised in the seventh message.

In one embodiment, the relay mode comprised in the sixth information comprises the L2 relay and the L3 relay, and the relay mode comprised in the seventh message comprises at least one of the L2 relay or the L3 relay.

In one embodiment, the relay mode comprised in the sixth message comprises the L2 relay; the relay mode comprised in the seventh message comprises the L2 relay.

In one embodiment, the relay mode comprised in the sixth message comprises the L3 relay; the relay mode comprised in the seventh message comprises the L3 relay.

In one embodiment, the relay mode comprised in the sixth message comprises at least one of the L2 relay or the L3 relay; the relay mode comprised in the seventh message comprises not supporting relay mode.

In one embodiment, the seventh message is used to generate the first message.

In one embodiment, the transmitter of the first message determines the relay mode based on the seventh message; the relay mode is used to generate the first message.

In one embodiment, the transmitter of the first message determining the relay mode based on the seventh message comprises: when the seventh message comprises the L2 relay, it is determined that the relay mode is L2 relay.

In one embodiment, the transmitter of the first message determining the relay mode based on the seventh message comprises: when the seventh message comprises the L3 relay, it is determined that the relay mode is L3 relay.

In one embodiment, the transmitter of the first message determining the relay mode based on the seventh message comprises: when the seventh message comprises the L2 relay and the L3 relay, the transmitter of the first message is randomly selected with equal probability to determine whether the relay mode is L2 relay or L3 relay.

In one embodiment, the transmitter of the first message determining the relay mode based on the seventh message comprises: when the seventh message comprises the L2 relay and the L3 relay, the transmitter of the first message determines the relay mode based on RRC state of the first node.

In one embodiment, the transmitter of the first message determining the relay mode based on the seventh message comprises: when the seventh message comprises the L2 relay and the L3 relay, and when RRC state of the first node is RRC_CONNECTED state, the transmitter of the first message determines that the relay mode is L2 relay.

In one embodiment, the transmitter of the first message determining the relay mode based on the seventh message comprises: when the seventh message comprises the L2 relay and the L3 relay, and when RRC state of the first node is RRC_INACTIVE state, the transmitter of the first message determines that the relay mode is L3 relay.

In one embodiment, the transmitter of the first message determines and generates the first message based on the seventh message and RRC state in which the first message is transmitted.

In one embodiment, when RRC state in which the first message is transmitted is the RRC_INACTIVE state, and the seventh message indicates the L2 relay, it is determined and generated that the first message comprises the PC5 signaling.

In one embodiment, when RRC state in which the first message is transmitted is the RRC_INACTIVE state, and the seventh message indicates the L2 relay, it is determined and generated that the first message comprises the Uu signaling.

In one embodiment, when RRC state in which the first message is transmitted is the RRC_INACTIVE state, and the seventh message indicates the L3 relay, it is determined and generated that the first message comprises the Uu signaling.

In one embodiment, when RRC state in which the first message is transmitted is the RRC_INACTIVE state, and the seventh message indicates the L3 relay, it is determined and generated that the first message comprises the PC5 signaling.

Embodiment 10A

Figure 10A:
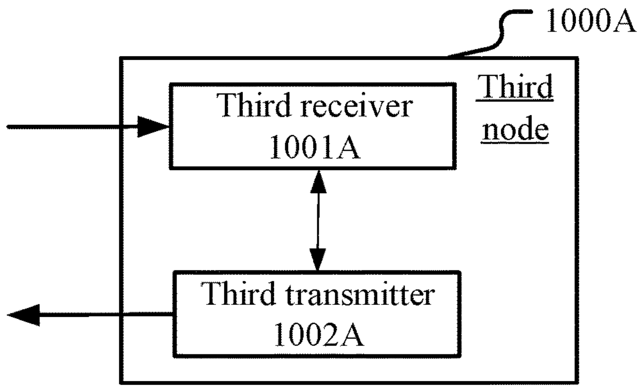
FIG. 10A illustrates a structure block diagram of a processor in a third node according to one embodiment of the present application.

Embodiment 10A illustrates a structure block diagram of a processor in a third node according to one embodiment of the present application, as shown in FIG. 10A.

In embodiment 10A, the third transmitter 1002A transmits a sixth message through cellular link; the third receiver 1001A receives a first bit group through cellular link, and the first bit group comprises at least one bit; herein, the sixth message is used to generate third message; the third message is used to configure a third RLC bearer; the third message is used to indicate entering into RRC_INACTIVE state; the first bit group is received through the third RLC bearer; the third RLC bearer corresponds to a target bearer; the first bit group belongs to the target bearer.

In one embodiment, the third transmitter 1002A transmits a fourth message through cellular link; herein, the sixth message is transmitted before the fourth message; the fourth message indicates that a first RLC bearer is suspended; the first RLC bearer corresponds to the target bearer.

In one embodiment, the fourth message is used to implicitly indicate that a second RLC bearer is suspended; herein, a fourth RLC bearer set is mapped to the second RLC bearer; the fourth RLC bearer set comprises the first RLC bearer; all RLC bearers in the fourth RLC bearers set are suspended; the second RLC bearer corresponds to the target bearer.

In one embodiment, the third transmitter 1002A transmits a fifth message through cellular link before transmitting the sixth message; the third receiver 1001A receives a fourth bit group after transmitting the fifth message and before transmitting the sixth message; herein, the fifth message configures the first RLC bearer and the second RLC bearer.

Embodiment 10B

Figure 10B:
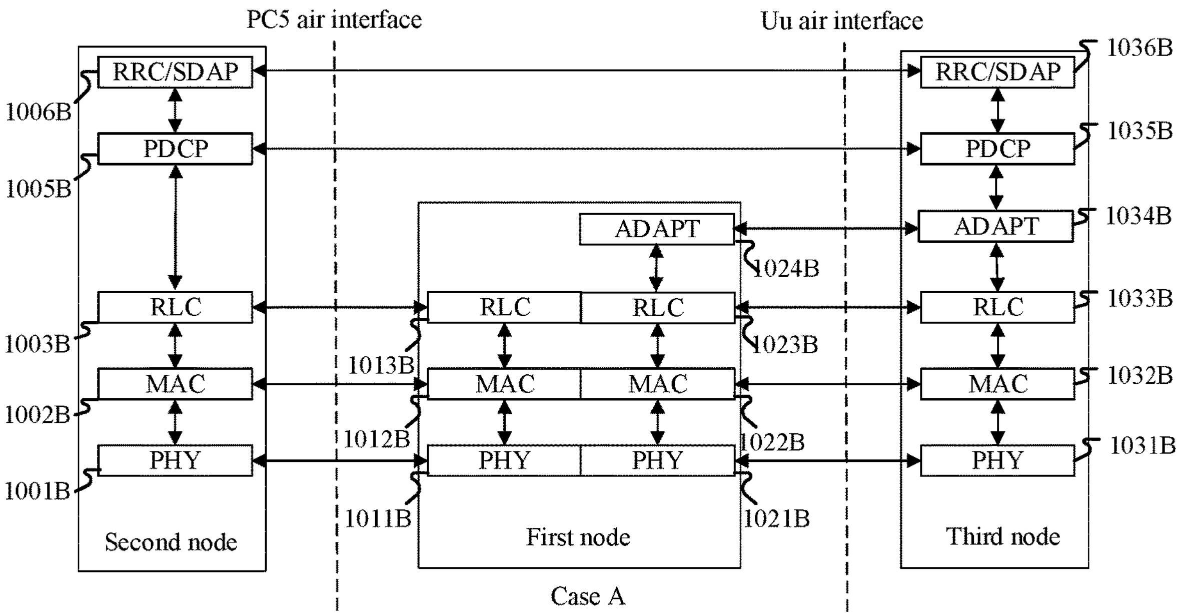
FIG. 10B illustrates a schematic diagram of a radio protocol architecture of relay transmission according to one embodiment of the present application.
Figure 10B:
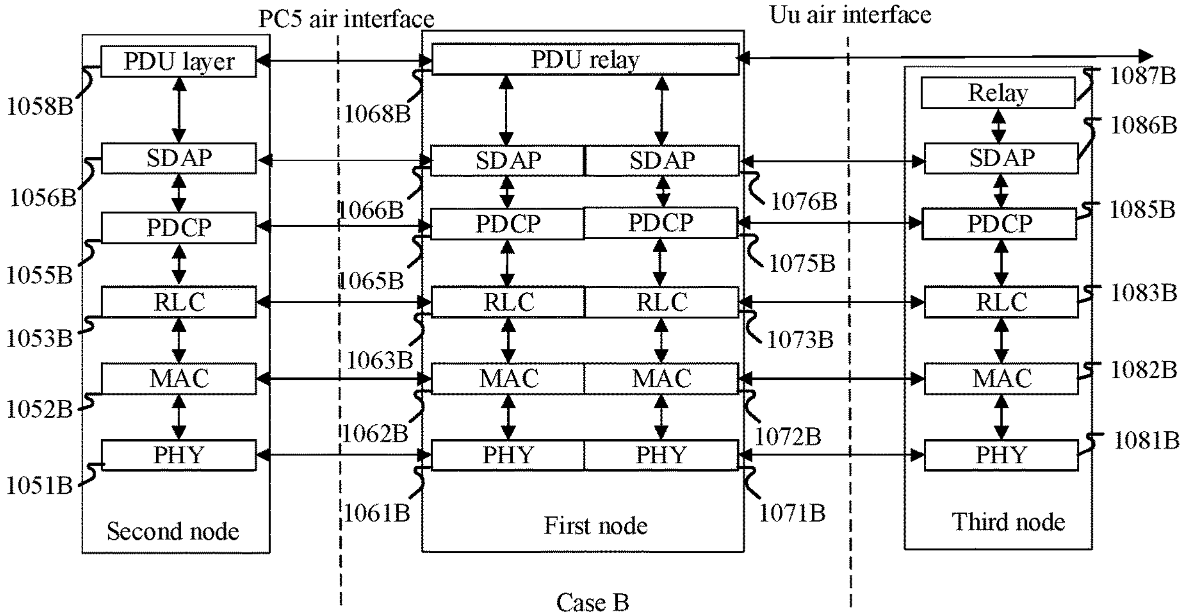

Embodiment 10B illustrates a schematic diagram of a radio protocol architecture of a relay transmission according to one embodiment of the present application, as shown in FIG. 10B.

In case A of FIG. 10B, in a relay transmission, taking data transmitted by a second node through a first node to a third node as an example (data transmitted by the third node through the first node to the second node is in the same way): first target data is sequentially processed by the PDCP sublayer 1005B and RLC sublayer 1003B at the second node side to generate a first target MAC PDU at the MAC sublayer 1002B, which is then transferred to the PHY layer 1001B, and then is transmitted to the PHY layer 1011B of the first node via a PC5 air interface, and then is processed by the MAC sublayer 1012B and RLC sublayer 1013B to recover the first RLC data; the first RLC data is processed by the ADAPT sublayer 1024B to regenerate into second RLC data at the RLC sublayer 1023B, after being processed by the MAC sublayer 1022B, a second target MAC PDU is generated and is transmitted to the PHY layer 1021B; then, it is transmitted to the PHY layer 1031B of the third node via a Uu air interface, and a second target MAC PDU is recovered through the MAC sublayer 1032B, then first target data is recovered through the processing of the RLC sublayer 1033B, the ADAPT sublayer 1034B, and the PDCP sublayer 1035B sequentially.

Case A of FIG. 10B illustrates a radio protocol architecture of the L2 relay; the first node is relay node; data forwarded by the relay node is processed by the MAC sublayer, the RLC sublayer, and the ADAPT sublayer, but not by the PDCP sublayer.

In case B of FIG. 10B, in a relay transmission, taking data transmitted by a second node through a first node to a third node as an example: first target data is sequentially processed by the PDU layer 1058B, the SDAP sublayer 1056B, the PDCP sublayer 1055B, and the RLC sublayer 1053B at the second node side to generate a first target MAC PDU at the MAC sublayer 1052B, which is then transferred to the PHY layer 1051B, and then is transmitted to the PHY layer 1061B of the first node via a PC5 air interface, and then first SDAP data is recovered through the processing of the MAC sublayer 1062B, the RLC sublayer 1063B, the PDCP sublayer 1065B, and the SDAP sublayer 1066B; the first SDAP data is processed by the PDU relay layer 1068B, and then is sequentially processed by the SDAP sublayer 1076B, the PDCP sublayer 1075B, the RLC sublayer 1073B, and the MAC sublayer 1072B to generate a second target MAC PDU to be transferred to the PHY layer 1071B; then, it is transmitted to the PHY layer 1081B of the third node via a Uu air interface, and then a second target MAC PDU is recovered through the MAC sublayer 1082B, then, it is processed by the RLC sublayer 1083B, the PDCP sublayer 1085B, the SDAP sublayer 1086B, and Relay layer before being transmitted to the backend core network; and the first target data is recovered at the core network PDU layer.

Case B of FIG. 10B illustrates a radio protocol architecture of the L3 relay; the first node is relay node; data forwarded by the relay node is processed by the MAC sublayer, the RLC sublayer, and the PDCP sublayer.

In one embodiment, the MAC sublayer, the RLC sublayer, and the ADAPT sublayer are located below the PDCP sublayer.

In one embodiment, the ADAPT sublayer implements bearer mapping function.

In one embodiment, the ADAPT sublayer implements routing function.

In one embodiment, the PDU relay sublayer implements routing function.

In one embodiment, the PDU relay sublayer implements bearer mapping function.

In one embodiment, the relay sublayer implements routing function.

In FIG. 10B, the routing function forwards a data packet received from the second node to the third node.

In FIG. 10B, the third node is a base station, the second node is a UE, and the first node is a relay node.

In FIG. 10B, the third node is a base station, the second node is an RSU, and the first node is a relay node.

Embodiment 11

Figure 11:
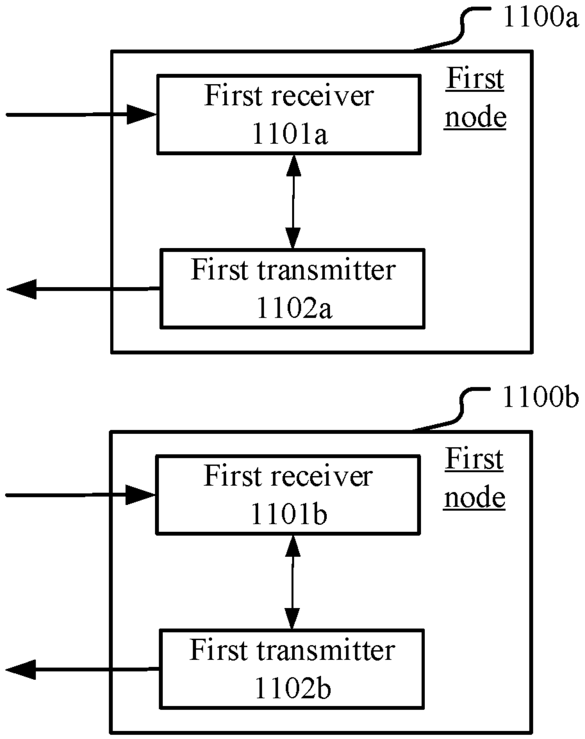
FIG. 11 illustrates a structure block diagram of a processor in a first node according to one embodiment of the present application.

Embodiment 11 illustrates a structure block diagram of a processor in a first node according to one embodiment of the present application, as shown in FIG. 11.

In FIG. 11, a processor 1100*a* in a first node comprises a first receiver 1101*a* and a first transmitter 1102*a*. The first receiver 1101*a* comprises at least one of the transmitter/receiver 454 (including the antenna 452), the receiving processor 456, the multi-antenna receiving processor 458 or the controller/processor 459 in FIG. 4 of the present application; the first transmitter 1102*a* comprises at least one of the transmitter/receiver 454 (including the antenna 452), the transmitting processor 468, the multi-antenna transmitting processor 457, or the controller/processor 459 in FIG. 4 of the present application.

In embodiment 11, the first receiver 1101*a* receives a first message through sidelink, and determines a first target RRC state based on at least the first message; receives a first bit set through sidelink; the first transmitter 1102*a* transmits a second message; generates a second bit set, transmits the second bit set through cellular link, and the second bit set comprises the first bit set; herein, the first target RRC state is one of RRC_INACTIVE state and RRC_CONNECTED state; the second message is used to indicate the first target RRC state.

In one embodiment, for the RRC_INACTIVE state and the RRC_CONNECTED state, only when the first target RRC state is the RRC_INACTIVE state, the behavior of generating the second bit set comprises generating at least one PDCP PDU header, the second bit set comprises at least one PDCP PDU header, and any PDCP PDU header in the at least one PDCP PDU header comprises a PDCP sequence number.

In one embodiment, the first transmitter 1102*a* transmits a third message through sidelink; herein, the second message is transmitted through cellular link, and the third message is used to indicate that a transmitter of the first message enters into or maintains the first target RRC state.

In one embodiment, the first transmitter 1102*a* transmits a fourth message through cellular link; herein, the second message is transmitted through sidelink, and the fourth message is used to indicate that the first node enters into or maintains the first target RRC state.

In one embodiment, the first receiver 1101*a* receives a third bit set through sidelink before receiving the first message, and receives a fifth message through cellular link before receiving the first message and after a fourth bit set being transmitted; the first transmitter 1102*a* generates and transmits the fourth bit set through cellular link before receiving the first message, the fourth bit set comprises the third bit set; herein, the fifth message is used to indicate that the first node enters into a second target RRC state, and the first node is in the second target RRC state when receiving the first message, the second target RRC state is either the RRC_INACTIVE state or the RRC_CONNECTED state, and the second target RRC state is different from the first target RRC state; only one of the behavior of generating a second bit set and the behavior of generating a fourth bit set being in the RRC_INACTIVE state comprises generating at least one PDCP PDU header, a corresponding bit set comprises the at least one PDCP PDU header, and any PDCP PDU header in the at least one PDCP PDU header comprises a PDCP sequence number; the fourth bit set and the second bit set are transmitted through a same RLC bearer.

In one embodiment, the first receiver 1101*a* receives a sixth message through cellular link; herein, the sixth message and the first message are used to determine the first target RRC state.

In one embodiment, the first transmitter 1102*a* transmits a seventh message through sidelink; herein, the seventh message is used to generate the first message.

In FIG. 11, a processor 1100*b* in a first node comprises a first receiver 1101*b* and a first transmitter 1102*b*. The first receiver 1101*b* comprises at least one of the transmitter/receiver 454 (including the antenna 452), the receiving processor 456, the multi-antenna receiving processor 458 or the controller/processor 459 in FIG. 4 of the present application; the first transmitter 1102*b* comprises at least one of the transmitter/receiver 454 (including the antenna 452), the transmitting processor 468, the multi-antenna transmitting processor 457, or the controller/processor 459 in FIG. 4 of the present application.

In Embodiment 11, the first receiver 1101*b* receives a first message through sidelink; receives a sixth message through cellular link; receives a first bit set through sidelink; the first transmitter 1102*b* transmits a seventh message through sidelink; transmits a second message; generates a second bit set, transmits the second bit set through cellular link, and the second bit set comprises the first bit set; herein, the sixth message is used to generate the seventh message; the seventh message is used to generate the first message; the second message is used to indicate the first target RRC state, and the first target RRC state is one of RRC_INACTIVE state and RRC_CONNECTED state.

In one embodiment, the sixth message and the first message are used to determine the first target RRC state.

In one embodiment, the sixth message indicates an available relay mode; the seventh message indicates a supported relay mode; herein, the available relay mode indicated by the sixth message comprises the supported relay mode indicated by the seventh message.

Embodiment 12

Figure 12:
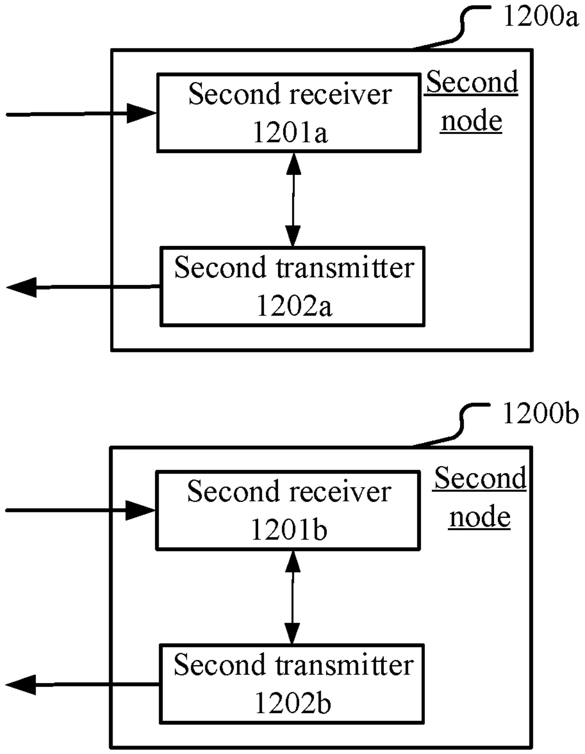
FIG. 12 illustrates a structure block diagram of a processor in second node according to one embodiment of the present application.

Embodiment 12 illustrates a structure block diagram of a processor in a second node according to one embodiment of the present application, as shown in FIG. 12.

In FIG. 12, a processor 1200*a* in a second node comprises a second receiver 1201*a* and a second transmitter 1202*a*. The second receiver 1201*a* comprises at least one of the transmitter/receiver 418 (including the antenna 420), the receiving processor 470, the multi-antenna receiving processor 472 or the controller/processor 475 in FIG. 4 of the present application; the second transmitter 1202*a* comprises at least one of the transmitter/receiver 418 (including the antenna 420), the transmitting processor 416, the multi-antenna transmitting processor 471 or the controller/processor 475 in FIG. 4 of the present application.

In embodiment 12, the second transmitter 1202*a* transmits a first message through sidelink, and at least the first message is used to determine a first target RRC state; transmits a first bit set through sidelink; herein, second message is transmitted; a second bit set is generated, and the second bit set is transmitted through cellular link, and the second bit set comprises the first bit set; the first target RRC state is one of RRC_INACTIVE state and RRC_CONNECTED state; the second message is used to indicate the first target RRC state.

In one embodiment, for the RRC_INACTIVE state and the RRC_CONNECTED state, only when the first target RRC state is the RRC_INACTIVE state, the second bit set being generated comprises that at least one PDCP PDU header is generated, the second bit set comprises at least one PDCP PDU header, and any PDCP PDU header in the at least one PDCP PDU header comprises a PDCP sequence number.

In one embodiment, the second receiver 1201*a* receives a third message through sidelink; herein, the second message is transmitted through cellular link, and the third message is used to indicate that the second node enters into or maintains the first target RRC state.

In one embodiment, the second receiver 1201*a* receives the second message through sidelink; herein, a fourth message is transmitted through cellular link; herein, the fourth message is used to indicate that a receiver of the first message enters into or maintains the first target RRC state.

In one embodiment, the second transmitter 1202*a* transmits a third bit set through sidelink before transmitting the first message, before transmitting the first message and after a fourth bit set is transmitted, a fifth message is received through cellular link; herein, the fourth bit set is generated and transmitted through cellular link before transmitting the first message, and the fourth bit set comprises the third bit set; the fifth message is used to indicate that the receiver of the first message enters into a second target RRC state, and the receiver of the first message is in the second target RRC state when receiving the first message, the second target RRC state is either the RRC_INACTIVE state or the RRC_CONNECTED state, and the second target RRC state is different from the first target RRC state; only one of the second bit set being generated and the fourth bit set being generated being in the RRC_INACTIVE state comprises at least one PDCP PDU being generated, and a corresponding bit set comprises the at least one PD CP PDU header, and any PDCP PDU header in the at least one PD CP PDU comprises a PD CP sequence number; the fourth bit set and the second bit set are transmitted through a same RLC bearer.

In one embodiment, a sixth message is received through cellular link; herein, the sixth message and the first message are used to determine the first target RRC state.

In one embodiment, the second receiver 1201*a* receives a seventh message through sidelink; herein, the seventh message is used to generate the first message.

In FIG. 12, a processor 1200*b* in a second node comprises a second receiver 1201*b* and a second transmitter 1202*b*. The second receiver 1201*b* comprises at least one of the transmitter/receiver 418 (including the antenna 420), the receiving processor 470, the multi-antenna receiving processor 472 or the controller/processor 475 in FIG. 4 of the present application; the second transmitter 1202*b* comprises at least one of the transmitter/receiver 418 (including the antenna 420), the transmitting processor 416, the multi-antenna transmitting processor 471 or the controller/processor 475 in FIG. 4 of the present application.

In embodiment 12, the second transmitter 1202*b* transmits a first message through sidelink; transmits a first bit set through sidelink; a second receiver 1201*b*, receives a seventh message through sidelink; herein, a sixth message is received through cellular link; the sixth message is used to generate the seventh message; the seventh message is used to generate the first message; second message is transmitted; a second bit set is generated, and the second bit set is transmitted through cellular link, and the second bit set comprises the first bit set; the second message is used to indicate a first target RRC state, and the first target RRC state is one of RRC_INACTIVE state and RRC_CONNECTED state.

In one embodiment, the sixth message and the first message are used to determine the first target RRC state.

In one embodiment, the sixth message indicates an available relay mode; the seventh message indicates a supported relay mode; herein, the available relay mode indicated by the sixth message comprises the supported relay mode indicated by the seventh message.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present application includes but not limited to mobile phones, tablet computers, laptops, network cards, low-power devices, enhanced Machine Type Communication (eMTC) devices, NB-IOT devices, vehicle-mounted communication equipment, aircrafts, airplanes, unmanned aerial vehicles (UAV), tele-controlled aircrafts and other wireless communication devices. The second-type communication node or the base station or the network side device in the present application includes but is not limited to the macro-cellular base stations, micro-cellular base stations, home base stations, relay base stations, eNB, gNB, Transmission and Reception Points (TRP), relay satellites, satellite base stations, air base stations and other wireless communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:

a first receiver configured to receive a first message indicating a first condition set that includes at least one condition through sidelink, and to determine a first transmission mode based on at least the first message, wherein the first message comprises a first threshold, and the first condition set comprises an indication that a first bit set has a data volume not less than a first threshold; and a first transmitter configured to transmit a first bit group by adopting the first transmission mode, the first bit group comprising at least one bit, and the first bit set comprising the first bit group;

wherein:

the first transmission mode is one transmission mode in a candidate transmission mode set that includes a transmission through cellular link and a transmission through sidelink; and when the at least one condition in the first condition set is satisfied, the candidate transmission mode set comprises a candidate transmission mode of a transmission through sidelink.

2. The first node according to claim 1, wherein the first condition set comprises an indication, in the first message, that a transmitter of the first message is in an RRC_CONNECTED state.

3. The first node according to claim 1, wherein:

when the first transmission mode is the transmission through sidelink, the first bit group is transmitted through a first RLC bearer;

when the first transmission mode is the transmission through cellular link, the first bit group is transmitted through a third RLC bearer;

the first RLC bearer and the third RLC bearer respectively correspond to a target bearer; and the first bit group belongs to the target bearer.

4. The first node according to claim 3, wherein:

the first transmitter is configured to transmit a second bit group through sidelink before receiving the first message; and the first receiver is configured to receive a second message before transmitting the second bit group, and to receive a third message through sidelink before receiving the first message and after transmitting the second bit group;

wherein:

the second message configures the first RLC bearer;

the third message configures the third RLC bearer; and the third message indicates that the first node enters into RRC_INACTIVE state.

5. The first node according to claim 4, wherein the third message is transmitted before a fourth message that indicates that the first RLC bearer is suspended.

6. The first node according to claim 5, wherein the fourth message indicates that a second RLC bearer is suspended;

wherein a fourth RLC bearer set is mapped to the second RLC bearer; the fourth RLC bearer set comprises the first RLC bearer; all RLC bearers in the fourth RLC bearers set are suspended; and the second RLC bearer corresponds to the target bearer.

7. A second node for wireless communications, comprising:

a second transmitter configured to transmit a first message used to determine a first transmission mode in a candidate transmission mode set through sidelink and to transmit a third bit group through cellular link, wherein the first message comprises a first threshold; and a second receiver configured to receive a first bit group through sidelink, the first bit group comprising at least one bit;

wherein:

the candidate transmission mode set comprises a transmission through cellular link and a transmission through sidelink;

the first message indicates a first condition set that includes at least one condition, wherein the first condition set comprises an indication that a first bit set has a data volume not less than a first threshold and the first bit set comprises the first bit group;

when the at least one condition in the first condition set is satisfied, the candidate transmission mode set comprises a candidate transmission mode of a transmission through sidelink; and the third bit group comprises the first bit group.

8. The second node according to claim 7, wherein the first condition set comprises an indication that the second node is in an RRC_CONNECTED state.

9. The second node according to claim 7, wherein the first bit group is received through a first RLC bearer; the first RLC bearer corresponds to a target bearer; and the first bit group belongs to the target bearer.

10. The second node according to claim 9, wherein:

the second receiver is configured to receive a second bit group through sidelink before the second transmitter transmits the first message and to receive a fifth message and a sixth message through cellular link; and the second transmitter is configured to transmit:

a second message before receiving the second bit group;

a third message through sidelink before transmitting the first message and after the second receiver receives the second bit group; and a fourth bit group through cellular link after the second receiver receives the fifth message and before the second receiver receives the sixth message;

wherein the fifth message is used to generate the second message; the fifth message configures the first RLC bearer and the second RLC bearer; the sixth message is used to generate the third message; the third message configures a third RLC bearer; the third message indicates that a receiver of the first message enters into RRC_INACTIVE state; and the fourth bit group comprises the second bit group.

11. The second node according to claim 10, wherein the second receiver is configured to receive a fourth message through cellular link; the sixth message is received before the fourth message; and the fourth message indicates that the first RLC bearer is suspended.

12. The second node according to claim 11, wherein;

the fourth message indicates that a second RLC bearer is suspended;

a fourth RLC bearer set is mapped to the second RLC bearer;

the fourth RLC bearer set comprises the first RLC bearer;

all RLC bearers in the fourth RLC bearers set are suspended; and the second RLC bearer corresponds to the target bearer.

13. A method in a first node for wireless communications, comprising:

receiving a first message through sidelink, wherein the first message comprises a first threshold;

determining a first transmission mode based on at least the first message; and transmitting a first bit group by adopting the first transmission mode, the first bit group comprising at least one bit;

wherein:

the first transmission mode is one transmission mode in a candidate transmission mode set, the candidate transmission mode set comprises a transmission through cellular link and a transmission through sidelink;

the first message indicates a first condition set, and the first condition set comprises at least one condition and an indication that a first bit set has a data volume not less than a first threshold, the first bit set comprising the first bit group;

when the at least one condition in the first condition set is satisfied, the candidate transmission mode set comprises a candidate transmission mode of a transmission through sidelink.

14. The method in a first node according to claim 13, wherein the first condition set comprises an indication, in the first message, that a transmitter of the first message is in an RRC_CONNECTED state.

15. The method in a first node according to claim 13, wherein:

when the first transmission mode is the transmission through sidelink, the first bit group is transmitted through a first RLC bearer;

when the first transmission mode is the transmission through cellular link, the first bit group is transmitted through a third RLC bearer;

the first RLC bearer and the third RLC bearer respectively correspond to a target bearer; and the first bit group belongs to the target bearer.

16. The method in a first node according to claim 15, comprising:

transmitting a second bit group through sidelink before receiving the first message;

receiving a second message before transmitting the second bit group; and receiving a third message through sidelink before receiving the first message and after transmitting the second bit group;

wherein the second message configures the first RLC bearer; the third message configures the third RLC bearer; and the third message indicates that the first node enters into RRC_INACTIVE state.

17. The method in a first node according to claim 16, wherein the third message is transmitted before a fourth message used to indicate that the first RLC bearer is suspended.

* * * * *